(12) United States Patent
Lennen

(10) Patent No.: US 6,954,488 B1
(45) Date of Patent: Oct. 11, 2005

(54) METHOD AND APPARATUS FOR IMPROVED L2 PERFORMANCE IN DUAL FREQUENCY SEMI-CODELESS GPS RECEIVERS

(75) Inventor: Gary Lennen, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/439,608

(22) Filed: Nov. 12, 1999

Related U.S. Application Data

(60) Provisional application No. 60/157,298, filed on Oct. 1, 1999.

(51) Int. Cl.[7] .............................................. H04B 1/69
(52) U.S. Cl. ..................................................... 375/149
(58) Field of Search ................................ 375/375, 137, 375/354, 359, 368, 316, 136, 147, 149, 150, 375/340, 130; 342/48, 90, 95, 96, 99; 701/213, 701/214, 215, 207, 200; 340/426.18–19, 340/426.1

(56) References Cited

U.S. PATENT DOCUMENTS

| | | | |
|---|---|---|---|
| 4,463,357 A | | 7/1984 | MacDoran |
| 4,667,203 A | | 5/1987 | Counselman, III |
| 4,809,005 A | * | 2/1989 | Counselman, III .......... 342/352 |
| 4,972,431 A | | 11/1990 | Keegan |
| 5,293,170 A | | 3/1994 | Lorenz et al. |
| 5,541,606 A | * | 7/1996 | Lennen .................. 342/357.12 |
| 5,576,715 A | * | 11/1996 | Litton et al. ........... 342/357.12 |
| 5,610,984 A | | 3/1997 | Lennen |
| 5,621,416 A | | 4/1997 | Lennen |
| 5,663,733 A | | 9/1997 | Lennen |
| 5,708,439 A | | 1/1998 | Lennen |
| 5,995,042 A | * | 11/1999 | Durboraw et al. ..... 342/357.02 |

\* cited by examiner

Primary Examiner—Tesfaldet Bocure
Assistant Examiner—Pankaj Kumar
(74) Attorney, Agent, or Firm—Donald S. Dowden; Cooper & Dunham LLP

(57) ABSTRACT

This invention relates to improving the signal-to-noise ratio of semi-codeless tracking by presenting a method and apparatus which employs an optimal W-code timing pattern, and/or provides signal-to-noise gain by adding L1 and L2 W-code bit timing estimate signals before combining the L1 W-code estimate signal with the L2 W-code estimate signal.

11 Claims, 16 Drawing Sheets

Locking to L2 method

Figure 1 - Overview Block Diagram

Figure 2 - L1/L2 Digital Channel Processor

Figure 3 - L1 Tracker

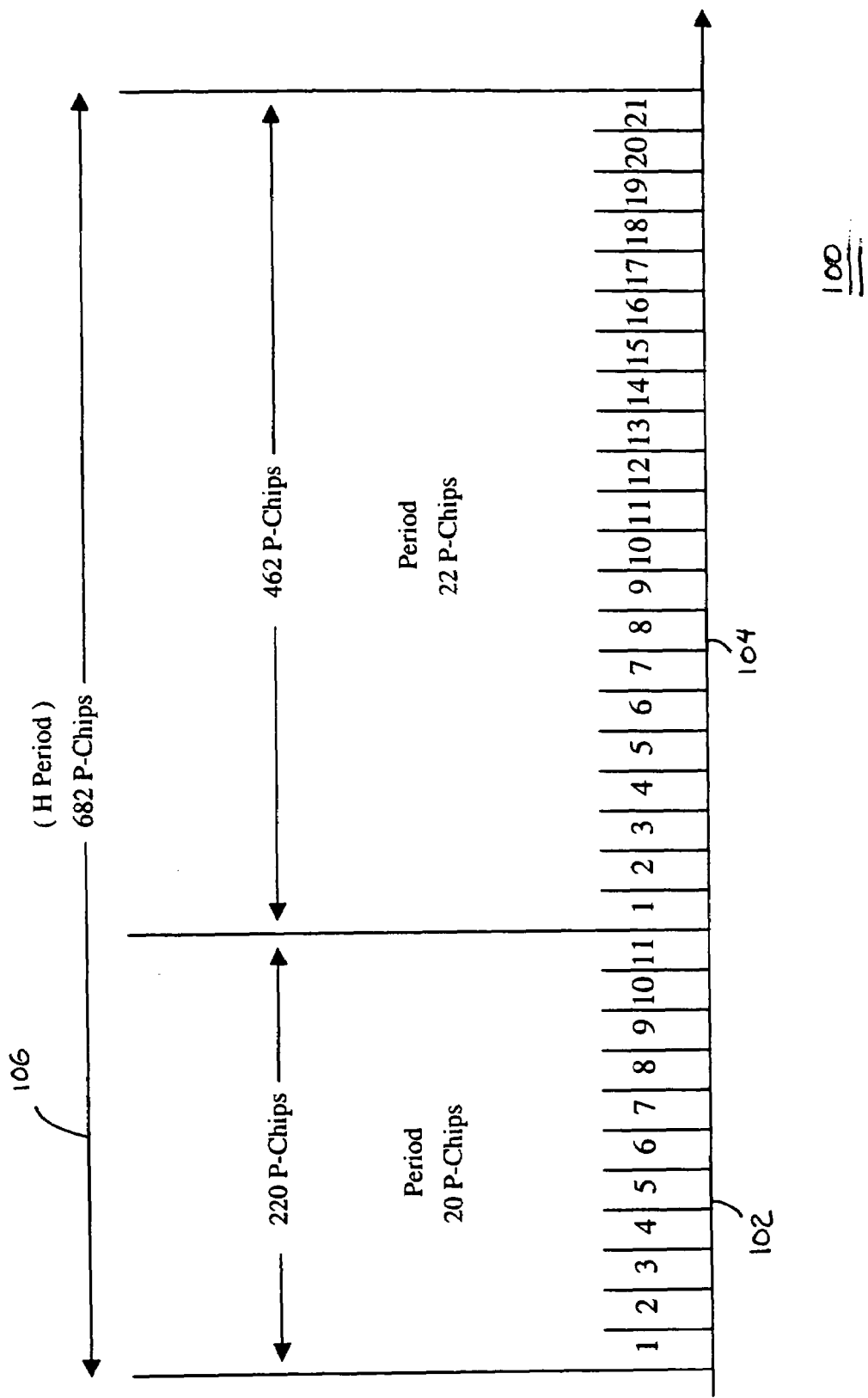
Figure 5a - H Period description - Part 1

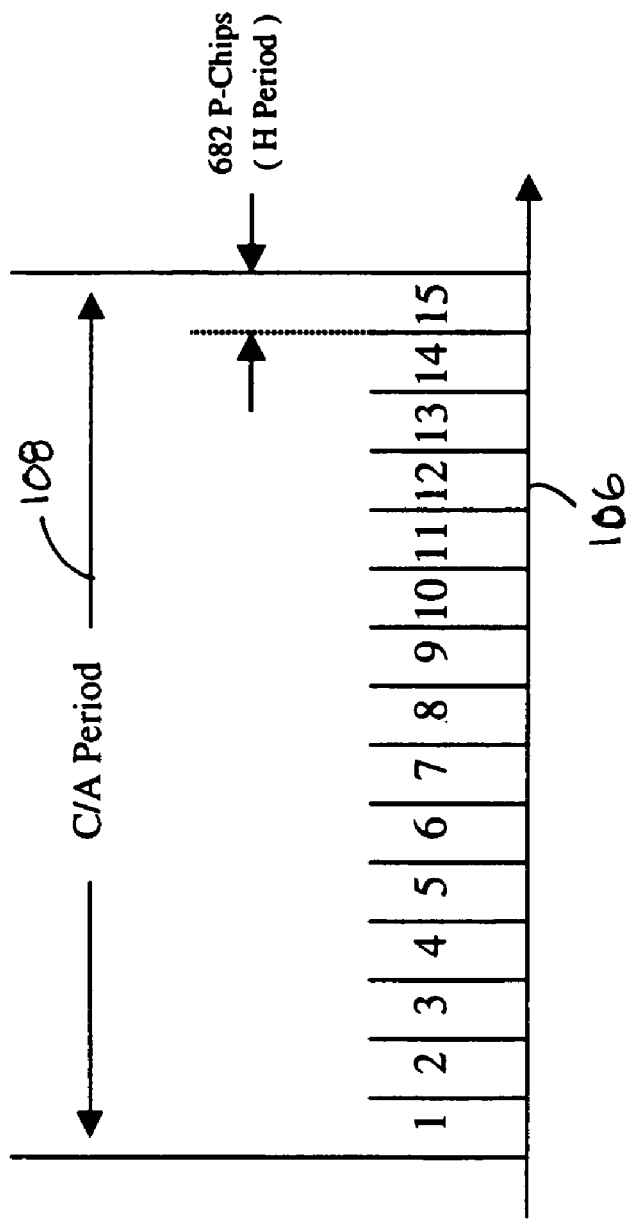
Figure 5b - H Period description - Part 2

Figure 7 - H Period Generator

Figure 8 - H Period Generator Timing

Figure 9 - L2 Tracker

Figure 10 - L2 P-Code Removal

Figure 11 - L2 W-Code Integrators

Figure 12 - L1 by L2 Multipliers

Figure 14 - Locking to L2 method

METHOD AND APPARATUS FOR IMPROVED L2 PERFORMANCE IN DUAL FREQUENCY SEMI-CODELESS GPS RECEIVERS

CROSS REFERENCE TO RELATED APPLICATIONS

This application claims the benefit of U.S. Provisional Application No. 60/157,298 filed Oct. 1, 1999.

FIELD OF THE INVENTION

This invention relates to the acquisition and tracking of signals transmitted in accordance with the Global Positioning System ("GPS"), and in particular, using information from the GPS signal transmitted in the frequency band about 1575.42 Megahertz (MHz) ("L1") to improve the signal-to-noise ratio ("SNR") for acquiring and tracking the GPS signal transmitted in the frequency band about 1227.6 MHz ("L2").

BACKGROUND OF THE INVENTION

Tracking the GPS L2 signal plays a significant role in high-end GPS receivers and especially for civilian applications such as machine control and survey equipment. The GPS L2 signal, like the GPS L1 signal, contains three or more separate components: (1) a carrier signal (such as a 1227.6 MHz sinusoidal waveform); (2) a code signal; and (3) a data signal. The code signal is combined (modulated) with the carrier signal so that each GPS signal source, for example a satellite, can be distinguished from each other according to the particular code employed by that GPS source. The data signal contains the information which allows a GPS receiver to calculate its location, for example, the location of the transmitting GPS source.

The GPS L1 signal can include both a coarse/acquisition ("C/A-code") code and a precision ("P-code") code. However, since the early 1990s, the GPS satellites have been transmitting both the C/A-code and an encrypted form of the P-code called the "Y-code". The Y-code is generated by encrypting the P-code with another code called the "W-code". The W-code is secret and is not available for civilian use. Unlike the GPS L1 signal, the GPS L2 signal only includes one code, which since the early 1990s has been the Y-code. Because the W-code is unknown, the Y-code cannot be tracked by conventional procedures in a civilian GPS receiver. However, because the Y-code is formed from the P-code, in combination with the W-code, sufficient information about the Y-code can be ascertained by a GPS receiver to augment the GPS receiver's ability to track GPS signals. This type of tracking is termed "semi-codeless" because at least the contribution of the P-code to the Y-code signal is known even if the W-code contribution is unknown.

A number of semi-codeless tracking techniques have been developed, see for example, U.S. Pat. No. 4,972,431 to Keegan et al., U.S. Pat. No. 5,293,170 to Lorenz et al., U.S. Pat. No. 5,541,606 to Lennen, U.S. Pat. No. 5,621,416 to Lennen, U.S. Pat. No. 5,663,733 to Lennen, and U.S. Pat. No. 5,610,984 to Lennen. Each of these patents and any other documents referred to in this specification are hereby incorporated into this application by the respective reference.

However, none of these references apply known information about the timing pattern of the W-code.

BRIEF SUMMARY OF THE INVENTION

One aspect of this invention is to improve the performance of semi-codeless L2 tracking in GPS receivers by using exact knowledge of the W-code timing information.

Another aspect of this invention is to combine estimates of the W-code component signals from the GPS L1 signal and the GPS L2 signal, and in particular, by adding the W-code estimate signals together before multiplying the result by the W-code estimate signal(s) for the GPS L2 signal.

These novel techniques improve signal-to-noise ratio when tracking the GPS L2 signal, which in turn leads to improved code and carrier measurement capability, as confirmed by experiments observing GPS satellites with a high gain antenna in addition to analysis and simulation of GPS receiver designs.

One object of this invention is to provide an apparatus for tracking signals having: (1) a first tracker for tracking a first component of a first signal and for generating a first estimate signal from a second component of the first signal; and (2) a second tracker for tracking a first component of a second signal according to the first estimate signal; such that the second component of the first signal has the same pattern as the first component of the second signal. This invention further provides for: (a) the pattern to be a known pattern combined with an unknown pattern; and/or (b) the timing information about the unknown pattern to be known.

Another object of the invention is for the first tracker to generate: (1) a timing signal in accordance with the timing information for improving the accuracy of the first estimate signal; and/or (2) a first local component signal in accordance with the known pattern and to combine the local component signal with a version of the first signal to generate the first estimate signal.

An additional object of this invention is to have the second tracker: (1) generate a second local component signal in accordance with the known pattern and combine the second local component signal with at least one version of the second signal to generate at least one second estimate signal; (2) generate a timing signal in accordance with the timing information for improving the accuracy of the at least one second estimate signal; (3) combine the first estimate signal with the at least one second estimate signal to provide a tracking signal for tracking the first component of the second signal; (4) combine the first estimate signal with at least one second estimate signal to generate a combined estimate signal; (5) combine the first estimate signal with the at least one second estimate signal when the second tracker has not locked to the first component of the second signal; and/or (6) combine the combined estimate signal with the at least one second estimate signal when the second tracker has locked to the first component of the second signal.

Another object of this invention provides for: (1) the first signal to be a GPS L1 signal; (2) the second signal to be a GPS L2 signal; (3) the first component of the GPS L1 signal to be a C/A-code component; (4) the second component of the GPS L1 signal to be a Y-code component; (5) the first component of the GPS L2 signal to be a Y-code component; (6) the known pattern to be a GPS P-code; and/or (7) the unknown pattern to be a GPS W-code.

A further object of this invention is to provide a method for tracking signals having the steps of: (1) locking to a first component of a first signal; (2) aligning a local version of a second component of the first signal with the first component of the first signal; (3) aligning a local version of a first component of a second signal with the first component of the first signal; (4) generating a first estimate signal from a version of the first signal and the local version of the second component; and/or (5) applying the first estimate signal for locking to a first component of the second signal; wherein the second component of the first signal and the first component of the second signal have the same pattern.

An additional object of this invention is to provide a method for tracking signals having the steps of: (1) locking to a first component of a first signal; (2) aligning a local version of a second component of the first signal with the first component of the first signal; (3) aligning a local version of a first component of a second signal with the first component of the first signal; (4) generating a first estimate signal from a version of the first signal and the local version of the second component; (5) generating a second estimate signal from a version of the second signal and a local version of the first component of the second signal; (6) combining the second estimate signal and the first estimate signal to generate a combined estimate signal; and/or (7) selectively applying either the first estimate signal or the combined estimate signal for locking to a first component of the second signal; wherein the second component of the first signal and the first component of the second signal have the same pattern. Further, this invention provides that the step of selectively applying further includes the steps of: (1) selecting the first estimate signal for application if the local version of the first component of the second component has not been locked; and/or (2) selecting the combined estimate signal for application if the local version of the first component of the second component has been locked.

A further object of this invention is to provide a method of semi-codeless tracking for a GPS receiver having the steps of: (1) receiving a GPS L1 signal and generating at least a quadrature baseband version of the GPS L1 signal; (2) receiving a GPS L2 signal and generating baseband versions of the GPS L2 signal; (3) multiplying the quadrature baseband version of the GPS L1 signal with a locally generated version of a P-code used to generate the Y-code component of both the GPS L1 and L2 signals to generate a first estimate signal related to the W-code used with the P-code to generate the Y-code component; (4) multiplying the in-phase baseband version of the GPS L2 signal with a locally generated version of the P-code to generate a second estimate signal related to the W-code used with the P-code to generate the Y-code component; (5) adding the first W-code estimate signal to the second W-code estimate signal to generate a combined W-code estimate signal; (6) applying the first W-code estimate signal to generate tracking signals for tracking when the GPS receiver has not locked to the GPS L2 signal; and/or (7) applying the second W-code estimate signal to generate tracking signals for tracking when the GPS receiver has locked to the GPS L2 signal.

Also, an object of this invention is to provide a method of semi-codeless tracking for a GPS receiver having the steps of: (1) receiving a GPS L1 signal and generating at least a quadrature baseband version of the GPS L1 signal; (2) receiving a GPS L2 signal and generating baseband versions of the GPS L2 signal; (3) multiplying the quadrature baseband version of the GPS L1 signal with a locally generated version of a P-code used to generate the Y-code component of both the GPS L1 and L2 signals to generate a first wide-band estimate signal related to the W-code used with the P-code to generate the Y-code component; (4) integrating the first wide-band estimate signal based on known timing information of the Y-code to generate a first narrow-band W-code estimate signal; (5) multiplying the in-phase baseband version of the GPS L2 signal with a locally generated version of the P-code to generate a second wide-band estimate signal related to the W-code used with the P-code to generate the Y-code component; (6) integrating the second wide-band estimate signal based on known timing information of the Y-code to generate a second narrow-band W-code estimate signal; (7) adding the first narrow-band W-code estimate signal to the second narrow-band W-code estimate signal to generate a combined W-code estimate signal; (8) applying the first narrow-band W-code estimate signal to generate tracking signals for tracking when the GPS receiver has not locked to the GPS L2 signal; and/or (9) applying the second narrow-band W-code estimate signal to generate tracking signals for tracking when the GPS receiver has locked to the GPS L2 signal.

These and other objects and advantages of the present invention will become apparent from the detailed description accompanying the claims and attached figures.

BRIEF DESCRIPTION OF THE DRAWINGS

FIG. 5a illustrates the W-code timing pattern as employed according to one embodiment of the invention;

FIG. 5b illustrates the relationship between the W-code timing pattern and the C/A-code timing pattern according to one embodiment of the invention;

DETAILED DESCRIPTION OF A PREFERRED EMBODIMENT

Figure 1:
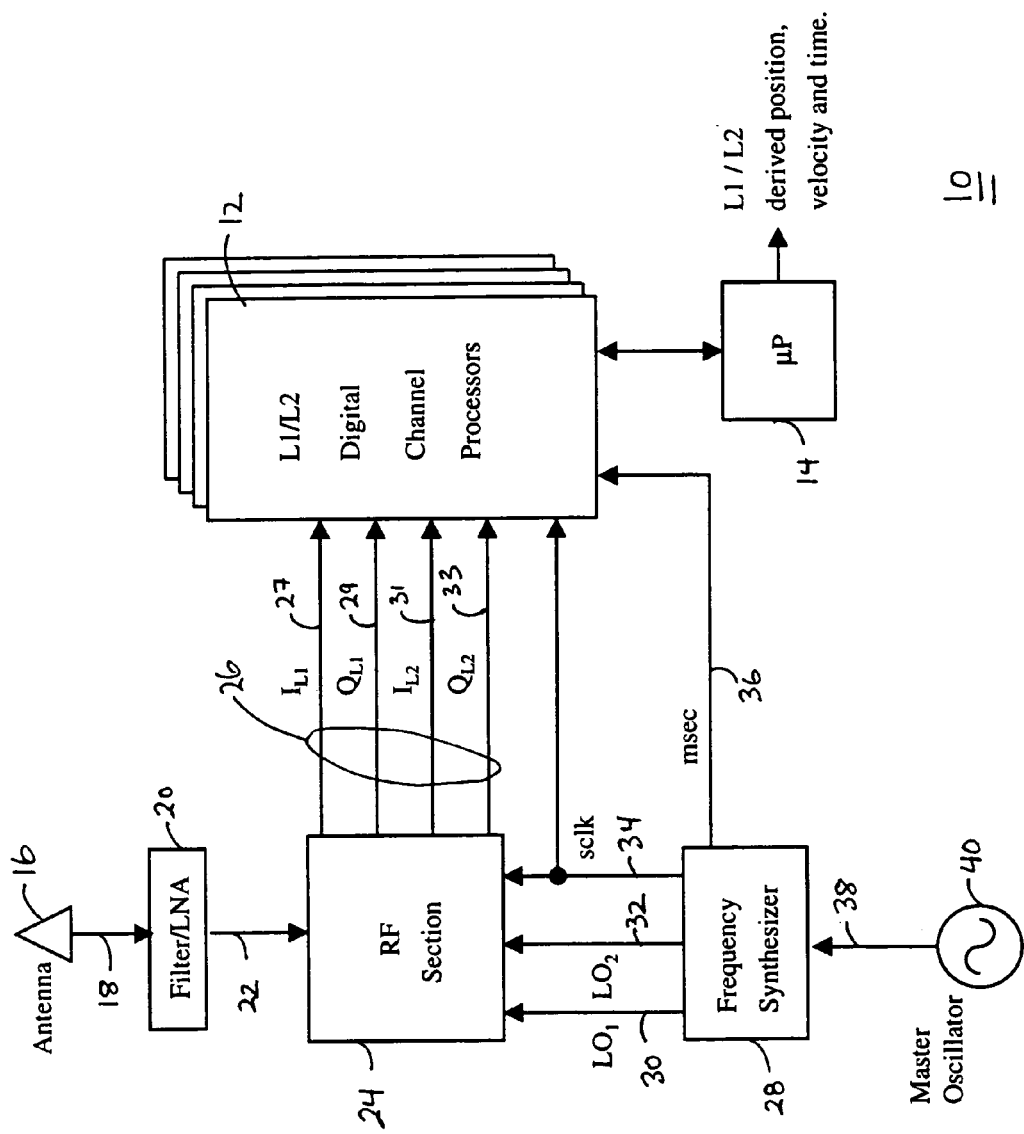
FIG. 1 illustrates at a high-level, a GPS receiver according to one embodiment of the invention.

FIG. 1 is a high-level illustration of a GPS receiver 10 in accordance with one embodiment of the invention. Key aspects of the invention are provided primarily in the L1/L2 digital channel processors (channel processors) 12. Although other portions of this GPS receiver 10 can be similar to conventional receivers, see for example, U.S. Pat.

No. 5,541,606 to Lennen, aspects of this invention can be incorporated elsewhere, for example, the software which runs on the microprocessor system 14.

In operation, the antenna 16 receives the GPS L1 and L2 signals transmitted from GPS satellites and other GPS sources. The antenna 16 outputs a corresponding antenna signal 18 which is filtered and amplified by filter/low-noise-amplifier (LNA) 20. The resulting filtered signal 22 is then translated (downconverted and digitized) by a radio frequency (RF) module 24 to generate intermediate frequency signals 26. Thus, for example, the GPS L1 signal is frequency translated to 420 kilohertz (kHz) and the GPS L2 signal is translated to 2.6 MHz. These intermediate frequency signals 26 are multi-bit, downconverted, digitized and sampled versions of the GPS signals, and include: (1) an in-phase version of the GPS L1 signal ($I_{L1}$) 27; (2) a 90 degree out-of-phase (quadrature) version of the GPS L1 signal ($Q_{L1}$) 29; (3) an in-phase version of the GPS L2 signal ($I_{L2}$) 31; and (4) a 90 degree out-of-phase (quadrature) version of the GPS L2 signal ($Q_{L2}$) 33.

The frequency synthesizer 28 generates at least two signals 30, 32 from one or more local oscillators. In particular, the frequency synthesizer 28 outputs two local oscillator signals ($LO_1$) 30 at 1400 MHz and ($LO_2$) 32 at 175 MHz which are input to the radio frequency module 24 and are used for the frequency translation. In addition, the frequency synthesizer 28 outputs two clock signals, sclk 34 and msec 36. Sample clock signal 34 operates at 25 MHz and is used, in addition to the channel processors 12, internally by the radio frequency module 24 to digitally sample the filtered signal 22, after the filtered signal is downconverted, to generate the intermediate frequency signals 26. The millisecond clock signal 36 operates at 1 kHz and is used to time measurements in the channel processors 12. The frequency synthesizer 28 is driven by a master oscillator signal 38 of 10 MHz which is generated by a master oscillator 40. Thus, all the frequency signals and clocks employed by the GPS receiver 10 for frequency translation and measurements are derived from the same fundamental source, master oscillator 40.

Because a single channel processor 12 is typically assigned to operate on GPS signals emanating from a single GPS source, as shown in FIG. 1, multiple channel processors 12 are typically employed to allow the GPS signals from multiple GPS sources to be observed simultaneously.

Each channel processor 12 interacts with a microprocessor system 14 such that the microprocessor system 14 can control operation of each channel processor including such functions, among others, as closing the code and carrier tracking loops, 120 reading correlator values, and updating code and carrier numerically controlled oscillators (NCOs). From information obtained from the channel processors 12, the microprocessor system 14 outputs position, velocity and time solutions to a user, or alternatively, provides raw code and carrier phase measurements. While a user will generally receive the outputs from the microprocessor system 14 on a display, the outputs of the microprocessor system can also be received by another microprocessor system or other device for additional processing or to perform other functions, such as, for example, controlling an automated vehicle.

Figure 2:
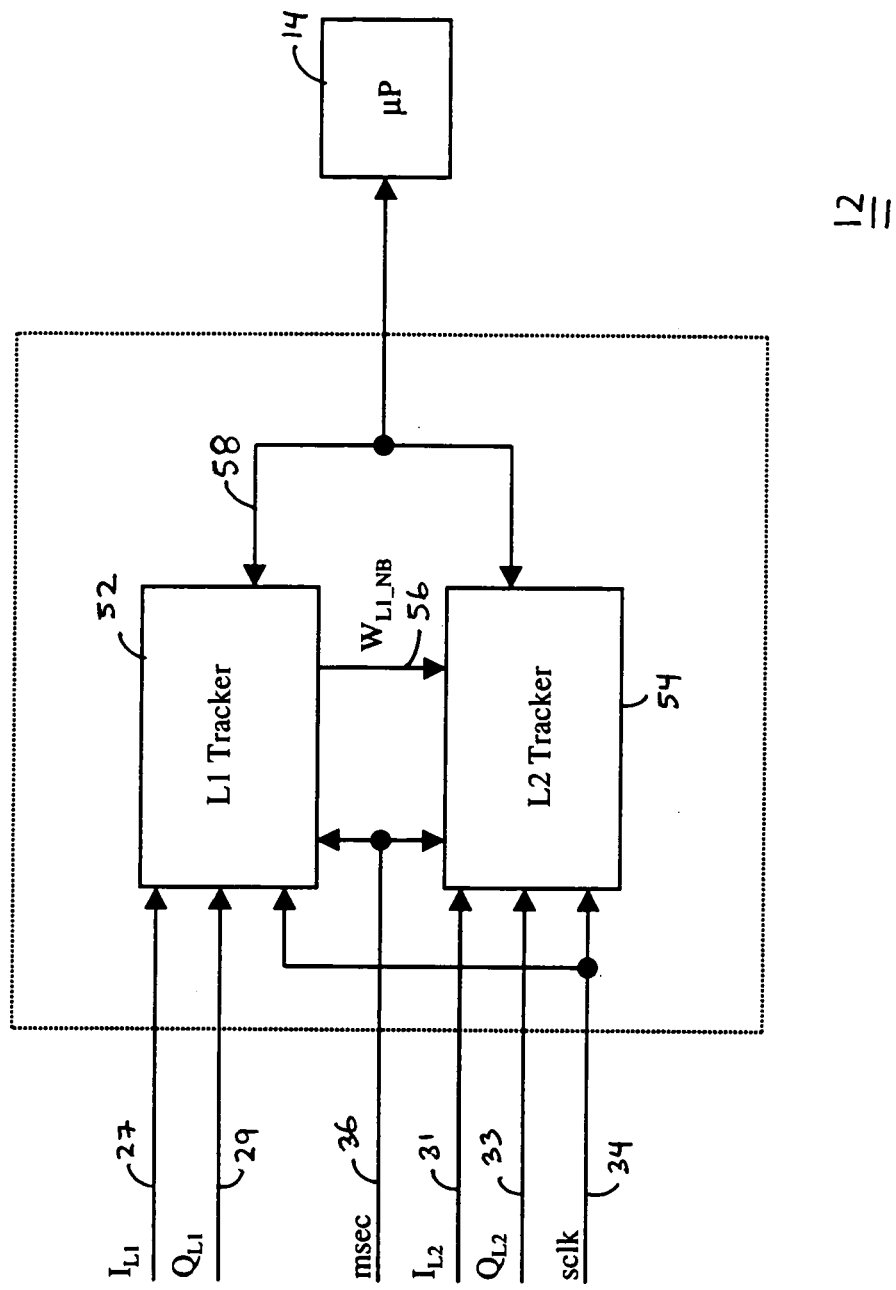
FIG. 2 illustrates a channel processor according to an embodiment of the invention.

FIG. 2 is a more detailed illustration of a channel processor 12 according to an embodiment of this invention.

Channel processor 12 includes two tracker modules, an L1 tracker 52 and an L2 tracker 54. The L1 tracker 52 observes the L1 intermediate frequency signals $I_{L1}$ and $Q_{L1}$. Similarly, the L2 tracker 54 observes the L2 intermediate frequency signals $I_{L2}$ and $Q_{L2}$. However, in addition to tracking the C/A-code component in the GPS L1 signal, the L1 tracker 52 provides a W-code estimate signal ($W_{L1_{13}\,NB}$) 56 which is a narrow-band (noise-reduced) signal which estimates the W-code used by the GPS source to generate the Y-code for the GPS L1 signal. This W-code estimate signal 56 is employed by the L2 tracker 54 to facilitate the semi-codeless tracking of one embodiment of the invention.

Because both the L1 tracker 52 and L2 tracker 54 are clocked synchronously from the sample clock signal 34, the digital trackers 52,54 are fully synchronous with each other. This synchronicity allows the microprocessor system 14 to place the L1 tracker 52 and L2 tracker 54 into an exact known state using control signals 58 relative to the sample clock signal 34 and the millisecond clock signal 36.

Figure 3:
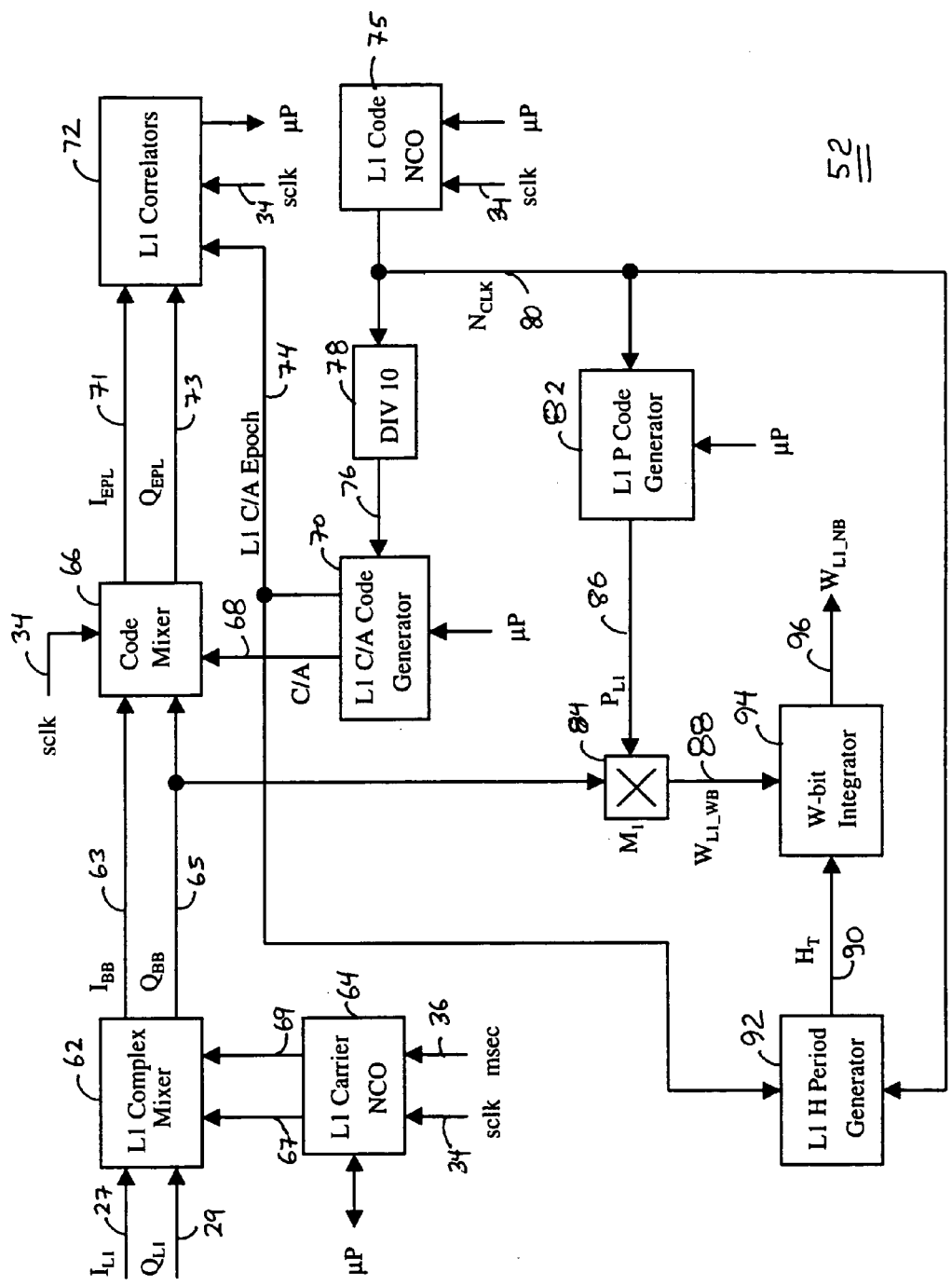
FIG. 3 illustrates a tracker for components of a GPS L1 signal according to one embodiment of the invention.

FIG. 3 is a detailed illustration of an L1 tracker 52 in accordance with one embodiment of the invention. As shown in FIG. 3, the L1 intermediate frequency signals, $I_{L1}$ and $Q_{L1}$ at the intermediate frequency of 420 kHz are received by a complex mixer 62. The complex mixer 62 translates (downconverts) the L1 intermediate frequency signals, $I_{L1}$ and $Q_{L1}$, to baseband, that is, the intermediate carrier frequency is removed (or nearly removed) to generate in-phase and quadrature baseband signals ($I_{BB}$ and $Q_{BB}$) 63,65. This translation employs in-phase and quadrature local oscillator signals 67, 69 which are generated by a carrier numerically controlled oscillator (carrier NCO) 64.

The baseband signals, $I_{BB}$ and $Q_{BB}$, which still retain the C/A-code and Y-code information, are then processed in a code mixer 66. The code mixer 66 mixes each of the baseband signals, $I_{BB}$ and $Q_{BB}$, with a locally generated C/A-code replica signal 68 of the C/A-code. Each baseband signal, $I_{BB}$ and $Q_{BB}$, is also mixed with time delayed versions of the replica signal 68. Typically, one time delayed version is early, one is punctual, and one is late with respect to the corresponding position in the C/A-code component of the respective baseband signal, $I_{BB}$ and $Q_{BB}$. In this way, the code mixer 66 generates six separate in-phase and quadrature signals, $I_E, I_P, I_L, Q_E, Q_P, Q_L$, collectively, ($I_{EPL}$) 71 and ($Q_{EPL}$) 73. These signals 71, 73 are integrated in the correlators 72, across a period of time determined by a C/A-code epoch signal 74. The C/A-code epoch signal 74 marks the intervals when a particular register, (the G1 register (not shown)), used to generate the C/A-code contains all ones. The microprocessor system 14 reads these signals, $I_{EPL}$ and $Q_{EPL}$ at regular intervals determined by the C/A-code epoch signal 74, and processes the read information to determine, among other functions, the position of the GPS receiver 10.

The code mixer 66 is provided with the C/A-code replica signal 68 from a C/A-code generator 70. The C/A-code generator 70 is driven by a C/A-code chipping rate signal 76. The C/A-code chipping rate, that is, the rate at which the bits (often called "code bits" or "chips") of the C/A-code are transmitted by a GPS source, is 1.023 MHz. The C/A-code chipping rate signal 76 is generated by a divider 78 which divides a nominal P-code chipping rate signal ($N_{CLK}$) 80 by 10. The P-code chipping rate is the rate at which bits of the P-code are transmitted by a GPS source which is set at 10.23 MHz. The nominal P-code chipping rate signal 80 is generated by a code numerically controlled oscillator (code NCO) 75. In addition to the C/A-code generator 70, the L1 tracker 52 includes a P-code generator 82.

In one embodiment of the invention, the operation and interaction of the complex mixer 62, carrier NCO 64, code mixer 66, C/A-code generator 70, divider 78, code NCO 75, correlators 72, and P-code generator 82 are conventional, see for example, U.S. Pat. No. 5,541,606 to Lennen, and "GPS Interface Control Document ICD-GPS-200", published by Rockwell International Corporation, Satellite Systems Division, Revision B-PR, Jul. 3, 1991. Thus, conventional techniques can be used with the invention to acquire GPS signals from GPS sources.

Once a GPS signal is acquired, and the GPS receiver 10 is tracking the C/A-code component of the GPS L1 signal, that is, the punctual signal $I_p$ is aligned (or almost aligned) with the C/A-code component of the GPS L1 signal, a key aspect of the invention can be activated. As discussed above, the Y-code transmitted from the source is substantially unknown, and thus, cannot be replicated in a civilian GPS receiver to facilitate full Y-code tracking of that component in the GPS L2 signal. Therefore, in this embodiment of the invention, the Y-code component of the GPS L1 signal is used to provide a W-code estimate which replaces an exact locally generated replica of the Y-code which would conventionally be generated to track the Y-code component of the GPS L2 signal.

To implement this concept in one embodiment of the invention, as discussed below, L1 and L2 W-code estimate signals are essentially multiplied together. However, this multiplication is affected by noise.

The intermediate frequency signals, $I_{L1}$, $Q_{L1}$, $I_{L2}$, $Q_{L2}$, contain versions of the components of the GPS signals in addition to noise which arises from both the GPS source and the travel of the GPS signals to the GPS receiver 10. The amount of noise in the intermediate frequency signals 26 is determined by both the signals' bandwidth and the pre-digitized bandwidth. For a sampling rate of 25 MHz, the pre-digitizing bandwidth is 12.5 MHz (which satisfies the Nyquist sampling theorem, that is the minimum bandwidth to maintain the information in the signal). This pre-digitizing bandwidth is maintained for the baseband signals, $I_{BB}$ and $Q_{BB}$, and subsequently the wide-band L1 W-code estimate signal 88. Both the L1 and L2 W-code estimate signals are substantially below the noise in the 12.5 MHz bandwidth, for example, the signal-to-noise ratio in a 12.5 MHz bandwidth is −25 decibels (dB). Thus, multiplying such noisy signals together leads to an output with substantially increased noise. In one embodiment of the invention, a 12.5 MHz bandwidth is the wide-band bandwidth, and a 500 kHz bandwidth is the narrow-band bandwidth.

Figure 4:
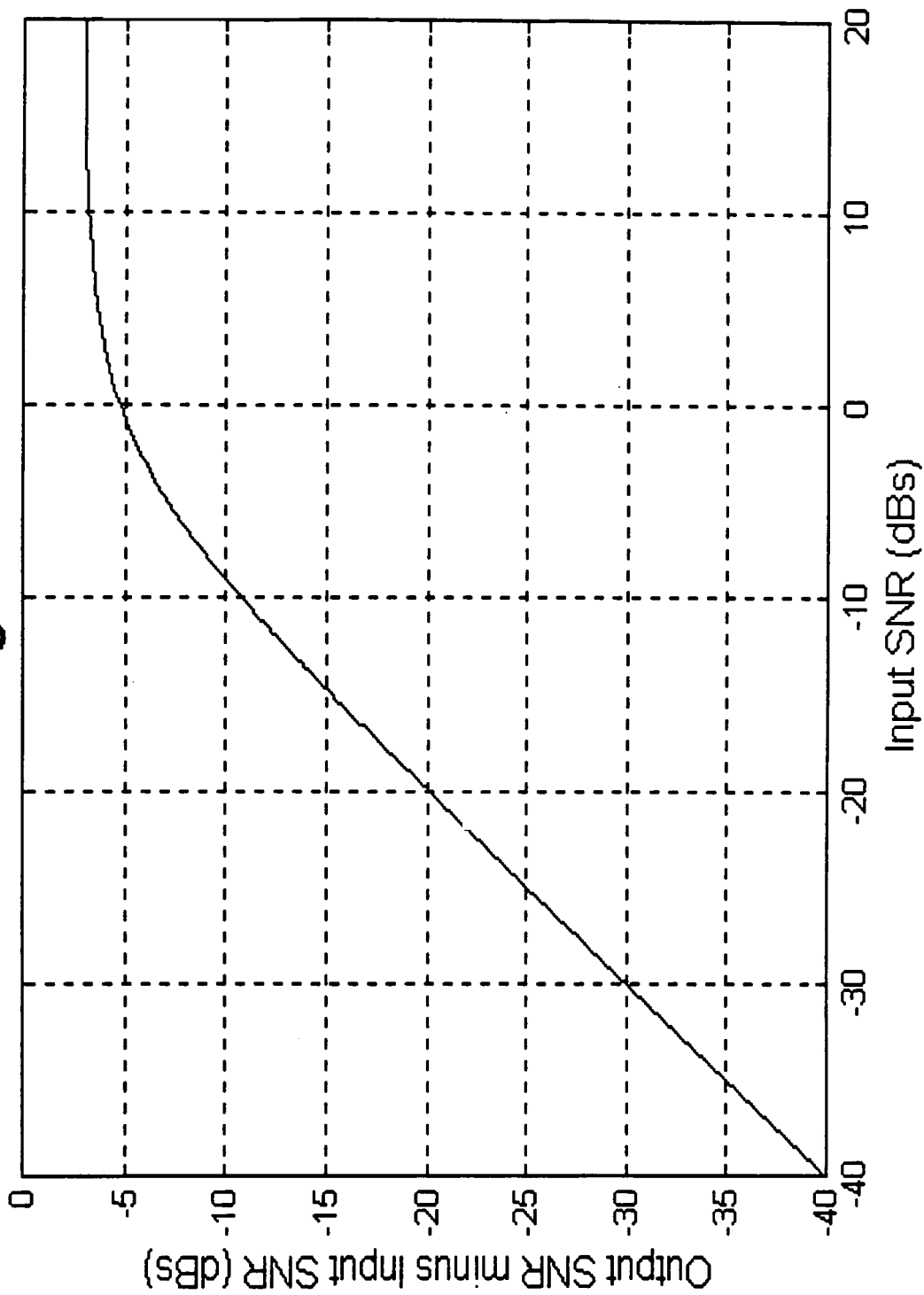
FIG. 4 illustrates the amount of signal-to-noise ratio gain or loss as affected by bandwidth according to one embodiment of the invention.

FIG. 4 demonstrates this increased noise effect by illustrating the loss in the signal-to-noise ratio from input to output when multiplying the L1 W-code estimate signal by the L2 W-code estimate signal. More specifically, if the L1 W-code estimate signal and the L2 W-code estimate signal are multiplied together in their respective +/−12.5 MHz bandwidths, the input signal-to-noise ratio is typically −25 dB. Thus, signal power suffers a loss of 25 dB. However, if the input signal-to-noise ratios of the L1 W-code estimate signal and the L2 W-code estimate signal are improved before multiplying, this loss is substantially reduced. Thus, for example, if the L1 W-code estimate signal and the L2 W-code estimate signal bandwidths are reduced to 500 kHz from 12.5 MHz the input signal-to-noise ratio will be: (−25 dB)+(14 dB)=(−11 dB), which results in an associated loss of approximately 11 dB. Hence, an important part of the invention is to optimally process the signal-to-noise ratio of the W-code estimate signals before the L1 W-code estimate signal and the L2 W-code estimate signal are multiplied together.

This optimal processing in one embodiment of the invention involves two techniques. The first technique is to ensure that integration of the multiplied result is performed between the exact W-code bit edges. The second technique is to add the L2 W-code estimate signal to the L1 W-code estimate signal before multiplying by the L2 W-code estimate signal for certain operations of the GPS receiver 10.

More specifically, when the GPS receiver 10 is tracking the C/A-code component of the GPS L1 signal using the in-phase baseband signal $I_{BB}$, as opposed to the quadrature baseband signal $Q_{BB}$ the in-phase baseband signal contains most, if not all, of the C/A-code component signal power. This concentration of the signal power occurs because the action of the C/A-code carrier tracking loop (typically, controlled by software operating in the microprocessor system 14) drives the carrier NCO 64 to minimize the C/A-code power in the quadrature baseband signal $Q_{BB}$, thereby maximizing the C/A-code power in the in-phase baseband signal $I_{BB}$.

Because GPS sources transmit the C/A-code component in phase quadrature with respect to the Y-code (or P-code) component on respective carrier components which are also in phase quadrature with respect to each other, minimizing the C/A-code component signal power in the quadrature baseband signal $Q_{BB}$ also maximizes the Y-code component signal power in the quadrature baseband signal, $Q_{BB}$. For this reason, according to one embodiment of the invention, only the quadrature baseband signal $Q_{BB}$ need be processed for the semi-codeless tracking of the GPS L2 signal.

As shown in FIG. 3, the quadrature baseband signal $Q_{BB}$ is provided to a multiplier 84. The multiplier 84 generates an estimate of the W-code component of the GPS L1 signal from the quadrature baseband signal $Q_{BB}$ by multiplying the quadrature baseband signal $Q_{BB}$ with a locally generated replica of the P-code component 86 of the GPS L1 signal. This P-code replica signal 86 is generated by the P-code generator 82. As discussed above, because Y-code is generated in GPS sources by encrypting a known P-code with an unknown W-code, the attempt by the multiplication in the multiplier 84 to strip the P-code component from the Y-code component in the quadrature baseband signal $Q_{BB}$ results in an estimate of the W-code component which is provided as a wide-band L1 W-code signal ($W_{L1\_WB}$) 88. Furthermore, because the tracking of the L1 C/A-code signal allows the receiver to provide a precise time estimate of the GPS source's P-code transmission (typically, accuracies within to 2–3 nanoseconds (nsecs) of the actual transmission time), the P-code generator 82 provides a P-code replica signal 86 which is substantially aligned with the P-code component encoded in the Y-code component generated by the GPS source. Because a procedure for determining the W-code pattern has been developed for the invention (see the discussion of the "H period" below), an H period clock signal ($H_T$) 90 generated by an H period generator 92 provides an exact time signal for the period of each W-code bit which the W-bit integrator 94 uses to perform a conventional integrate and dump operation on the wide-band W-code estimate signal 88 to generate an improved narrow-band (that is, less noisy) W-code estimate signal 96.

To implement the first technique of integrating the multiplied L1 and L2 Y-code estimate signals between the edges of the respective W-code bit, one embodiment of the invention includes a process for determining the precise location in time of each W-code bit edge. This process is illustrated in FIGS. 5a and 5b, and has been ascertained by observing GPS satellites using apparatus and methods described, for example, in U.S. Pat. No. 5,708,439 to Lennen.

The W-code timing pattern 100 as observed is the same for all GPS sources. FIG. 5a illustrate that the W-code timing pattern 100 can be fundamentally described in terms of two chipping rates, a first chipping rate of 20 P-code bits per W-code bit (about 0.5115 MHz) followed by a second chipping rate of 22 P-code bits per W-bit (about 0.465 MHz) The first chipping rate is used for 11 bits of the W-code while the second chipping rate is used for the next 21 bits of the W-code. This cycle repeats for every 32 bits of the W-code. This 32 bit W-code cycle can be defined as the "H period" 106. As shown in FIG. 5a, the H period 106 repeats every 682 bits of the P-code. Furthermore, as shown in FIG. 5b, the H periods 106 are synchronized with the C/A-code periods 108 and each C/A-code epoch corresponds to 15 H periods 106.

The information regarding the W-code timing pattern 100 does not reveal anything about the underlying W-code bits, which remain unknown. Therefore, the anti-spoofing capability of the Y-code is not defeated by knowing the W-code timing pattern 100. However, this knowledge of exact W-code timing pattern 100 allows for optimal integration across each unknown W-code bit.

Figure 6:
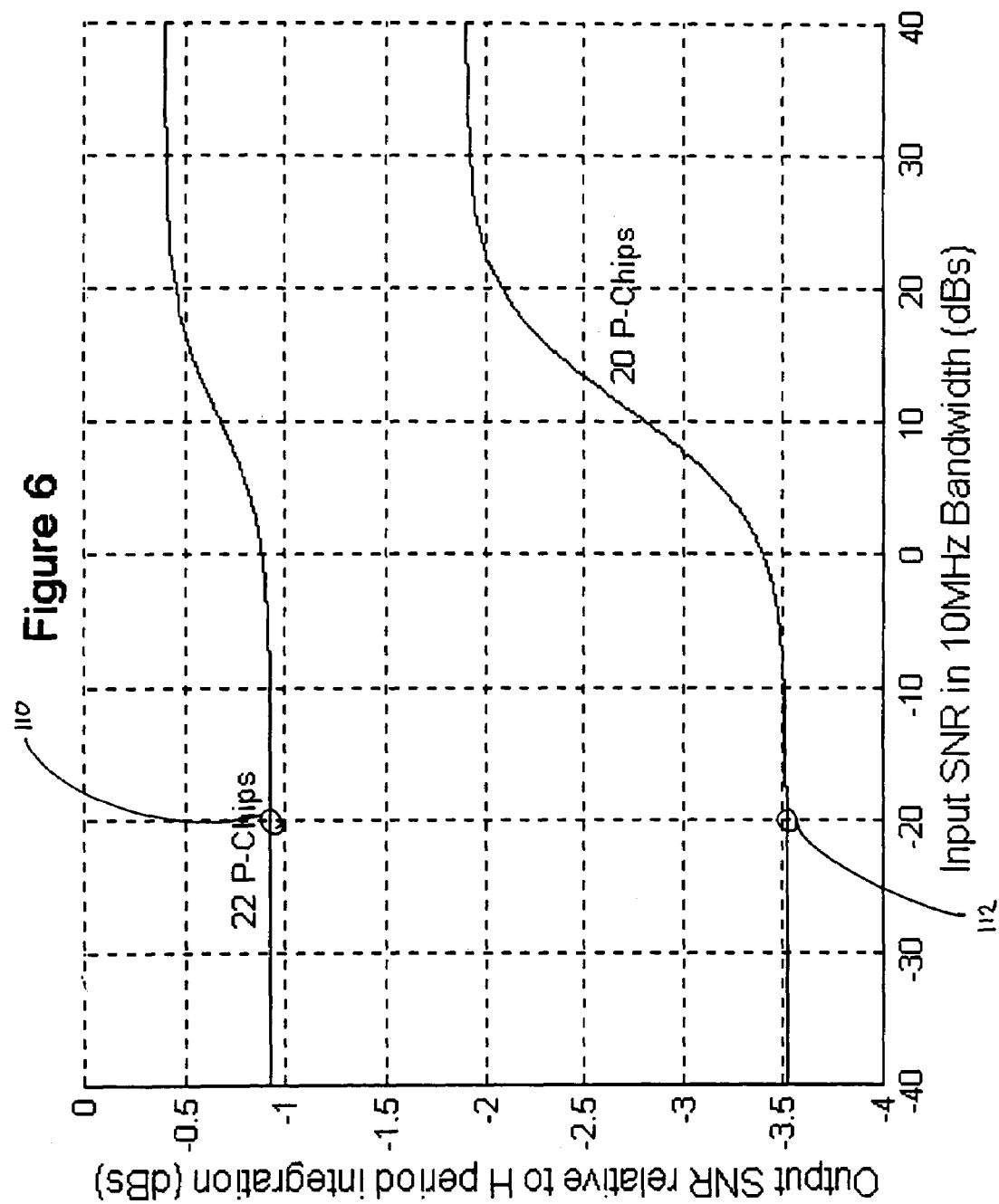
FIG. 6 illustrates the amount of signal-to-noise ratio gain or loss by comparing different W-code integration periods.

FIG. 6 shows the relative signal-to-noise ratio loss of using 22 P-code bit or 20 P-code bit integration periods when compared to the exact timing pattern of the H period 106. The nominal GPS signal input signal-to-noise ratio in a 10 MHz bandwidth is around −20 dB. Hence, from FIG. 5b, knowing and using the exact W-code timing pattern 100 improves the signal-to-noise ratio at the output of the W-code bit integration by approximately 0.9 dB 110 when compared to 22 P-code bit integration, and 3.5 dB 112 when compared to 20 P-code bit integration.

Figure 7:
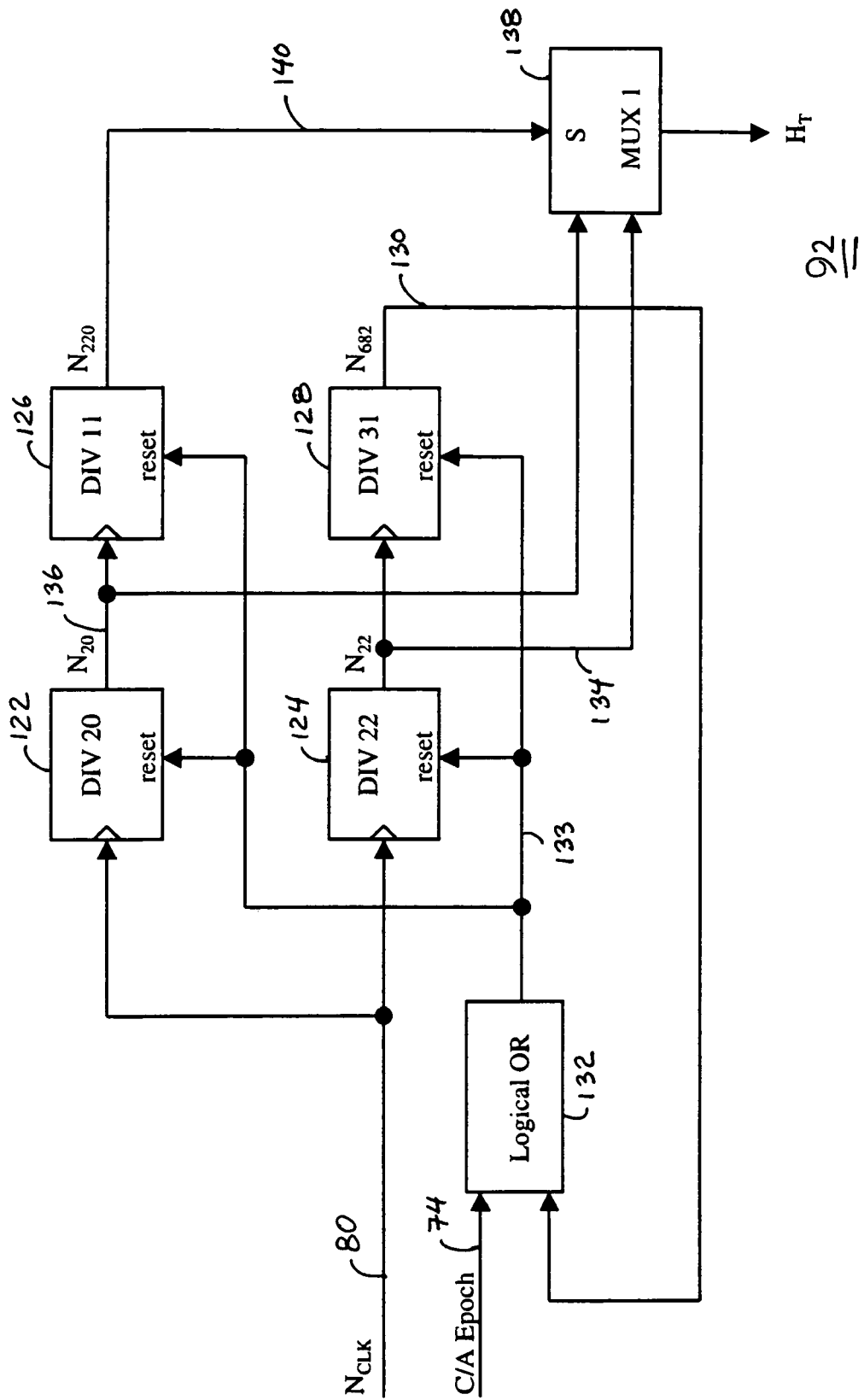
FIG. 7 illustrates an H period generator according to one embodiment of the invention.

FIG. 7 provides a detailed illustration for an H period generator 92 according to one embodiment of the invention. In this embodiment, four dividers 122, 124, 126, 128 are used. These dividers are reset to their initial conditions on the occurrence of two events. The first event is the start of C/A-code epoch as indicated by the C/A-code epoch signal 74 which ensures that the H period 106 is synchronous with the C/A-code epochs. The second event is the occurrence of each 682 bits as determined by the nominal P-code clock signal 80. The 682-bit period signal 130 repeats at a rate synchronous with the H period 106. The H period 106 is made synchronous with the 682-bit period signal 130 and the C/A-code epoch signal 74 by providing both signals to a logical OR gate 132 so that either signal can trigger the reset of the dividers 122, 124, 126, 128 with reset signal 133. More specifically, the nominal P-code clock signal 80 at a nominal rate 10.23 MHz is divided by 22 by divider 124 to generate the second chipping rate signal ($N_{22}$) 134 and is divided by 20 in divider 122 to generate the first chipping rate signal ($N_{20}$) 136. Both the first and second chipping rate signals 134, 136 are provided to a multiplexer 138. The multiplexer 138 can output either signal as the H period timing signal ($H_T$) 90. A switching signal (S) 140 determines whether multiplexer 138 should output the first chipping rate signal 136 or the second chipping rate signal 134 based on whether the first 11 bits of the H period's 32 bits have been output. Because the first 11 bits of the H period 106 correspond to 220 P-code bits, the switching signal 140 is generated by dividing first chipping rate signal 136 (20 P-code bits per W-code bit) by 11 in divider 126. The 682-bit period signal 130 is provided by dividing the second chipping rate signal 134 (22 P-code bits per W-code bit) by 31 in divider 128.

Figure 8:
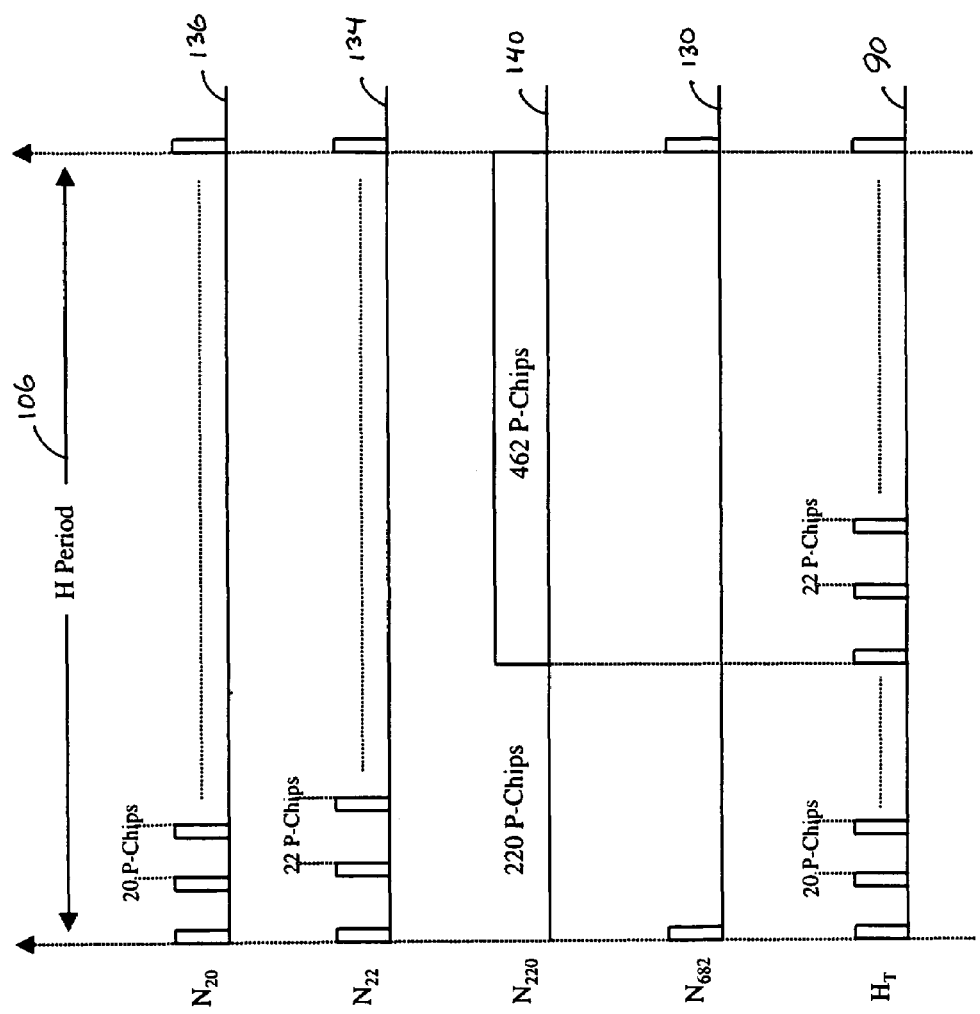
FIG. 8 illustrates the relative timing of various signals employed according to one embodiment of the invention.

FIG. 8 illustrates the relative timing of the first chipping rate signal 136, the second chipping rate signal 134, the switching signal 140, the 682-bit period signal 130, and the H period timing signal 90. Thus, as shown in FIG. 8, the resulting H period timing signal ($H_T$) 90, is a stream of pulses whose period may be 20 or 22 P-code bits wide depending on which bits of the W-code are being observed.

Figure 9:
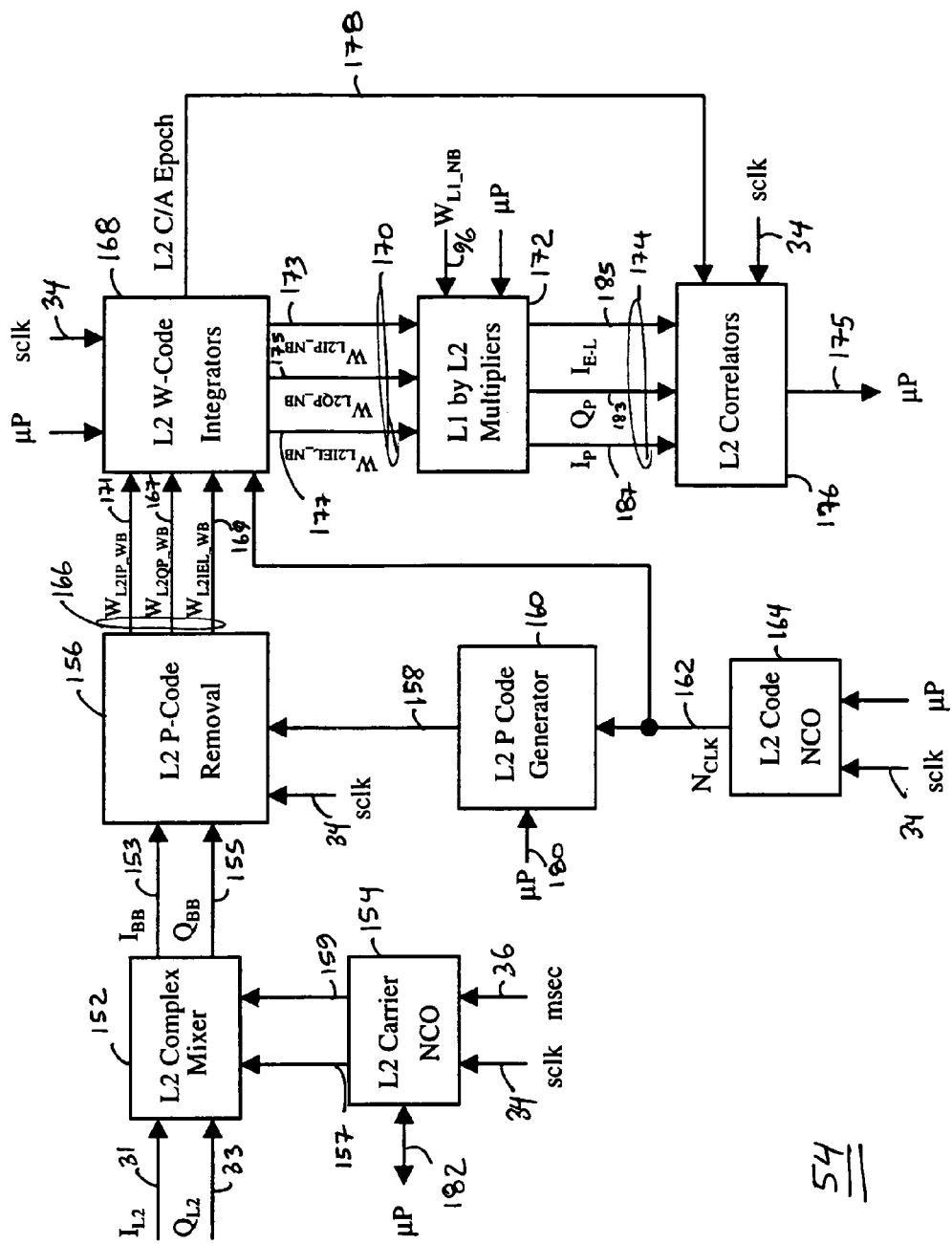
FIG. 9 illustrates a tracker for components of a GPS L2 signal according to one embodiment of the invention.

FIG. 9 illustrates the L2 tracker 54 according to one embodiment of the invention. The L2 tracker 54 processes in-phase and quadrature intermediate frequency signals ($I_{L2}$ and $Q_{L2}$) 31, 33. Similar to the L1 tracker 52, the combination of a complex mixer 152 and carrier NCO 154 remove the carrier component from the intermediate frequency signals, $I_{L2}$ and $Q_{L2}$ to provide in-phase and quadrature baseband signals ($I_{BB}$ and $Q_{BB}$) 153, 155. Analogously to the removal of the C/A-code component in the L1 tracker 52, P-code mixer 156 removes the P-code component from the baseband signals $I_{BB}$ and $Q_{BB}$, using a P-code replica signal 158 generated by P-code generator 160. The P-code generator 160 is driven by a nominal P-code clock signal ($N_{CLK}$) 162 generated by a code NCO 164 which, again, is similar to the L1 tracker 52 operation. The wide-band W-code signals 166 output from the P-code mixer 156 contain estimated versions of the W-code component of the GPS L2 signal with wide-band noise. These estimated wide-band W-code signals 166 include a wide-band W-code in-phase punctual signal ($W_{L2IP\_WB}$) 171, a wide-band quadrature punctual signal ($W_{L2QP\_WB}$) 167, and a wide-band in-phase early-minus-late signal ($W_{L2IEL\_WB}$) 169. These estimated wide-band W-code signals 166 are then integrated across respective W-code bit periods by the W-code integrators 168 to generate respective narrow-band versions of the wide-band signals ($W_{L2IP\_NB}$) 173, ($W_{L2QP\_NB}$) 175, ($W_{L2IEL\_NB}$) 177. These estimated narrow-band W-code signals 170 are multiplied by the W-code estimate signal 96 generated by the L1 tracker 52 in multipliers 172. The output signals from of the multipliers are stripped of the L2 carrier component, the P-code, and as much of the W-code as possible without knowing the W-code. These stripped signals ($I_P$) 181, ($Q_P$) 183, ($I_{E-L}$) 185 are further integrated in the correlators 176. The correlators 176 are read by the microprocessor system 14 at intervals determined by the L2 C/A-code epoch signal 178. The microprocessor system 14 then uses these values for code and carrier tracking loops based on the GPS L2 signal. The code tracking loop is closed when the microprocessor system 14 provides the control signal 180 to adjust the P-code replica signal by changing the output of the P-code NCO 160. Similarly, the carrier tracking loop is closed when the microprocessor system 14 provides the control signal 182 to adjust the carrier replica signals 157, 159 generated by the carrier NCO 154.

Figure 10:
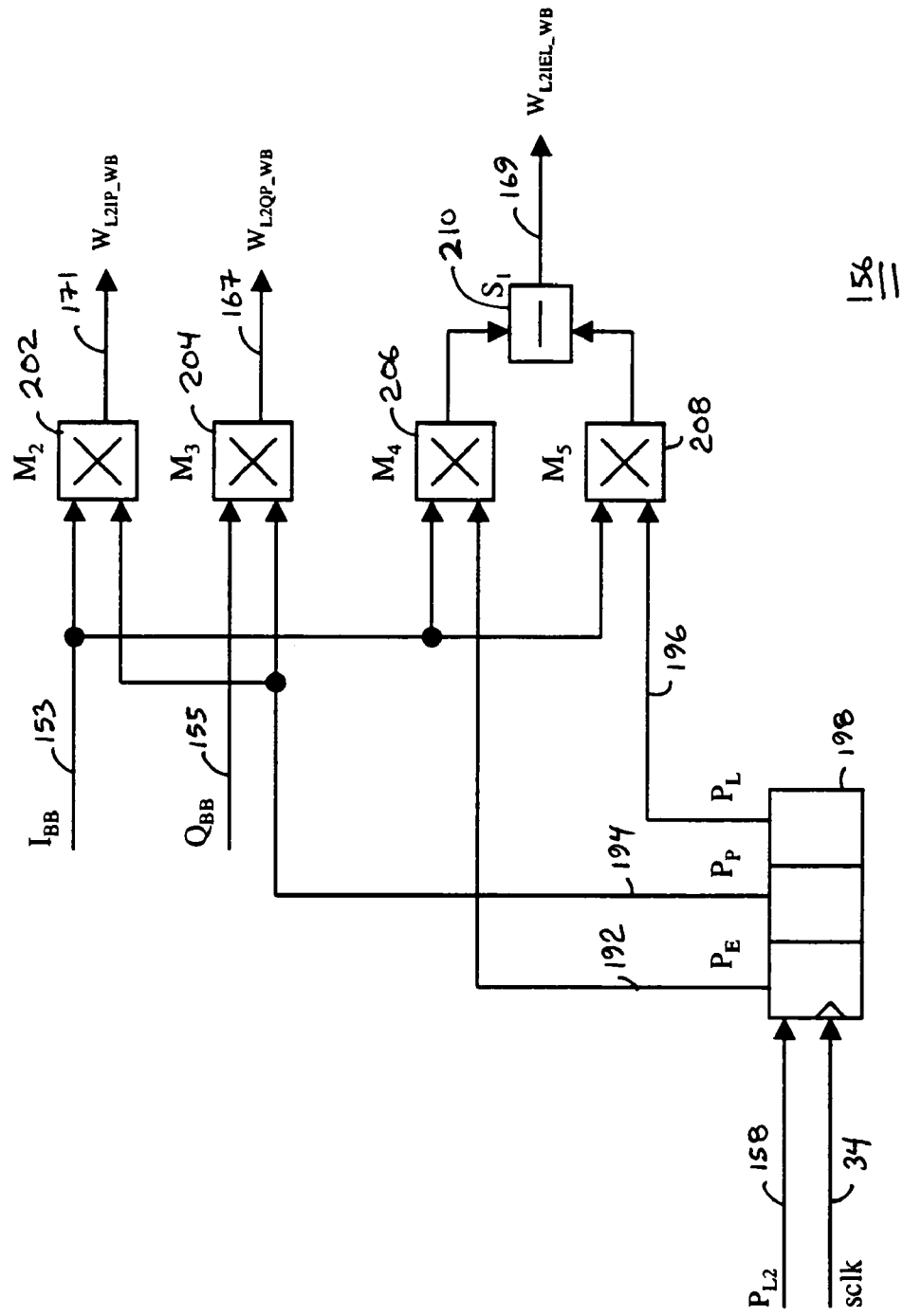
FIG. 10 illustrates a P-code mixer according to one embodiment of the invention.

FIG. 10 provides a detailed illustration of the P-code mixer 156 according to one embodiment of the invention. As shown in FIG. 10, the P-code replica signal 158 is used to generate time delayed versions 192, 194, 196 using a shift register 198. The separation in time is determined by the sample clock signal 34, which in this embodiment, has a period of is 40 nsecs (that is, a frequency of 25 MHz). In a first multiplier 202, the in-phase baseband signal $I_{BB}$ is mixed with the punctual version 194 of the delayed P-code replica signal 158, which results in the wide-band W-code in-phase punctual signal 171. Similarly, a second multiplier 204 multiplies the quadrature baseband signal $Q_{BB}$ by the punctual P-code replica signal 194 which results in the wide-band W-code quadrature punctual signal 167. A third multiplier 206 multiplies the in-phase baseband signal $I_{BB}$ by an early version of the P-code replica signal 192, and a fourth multiplier 208 multiplies the in-phase baseband signal $I_{BB}$ by the late version of the P-code replica signal 196. The outputs of third and fourth multipliers 206, 208 are subtracted from each other in subtractor 210 which results in the wide-band W-code in-phase early-minus-late signal 169, which can be used, after further processing by the microprocessor system 14, to close the L2 P-code tracking loop. The W-code punctual signals 167, 171, are used by the microprocessor system 14 to search and detect L2 signal power and then to close the L2 carrier tracking loop. All signals at the output of the P-code mixer 156 are in the original wide-band sampling bandwidth of +/−12.5 MHz.

Figure 11:
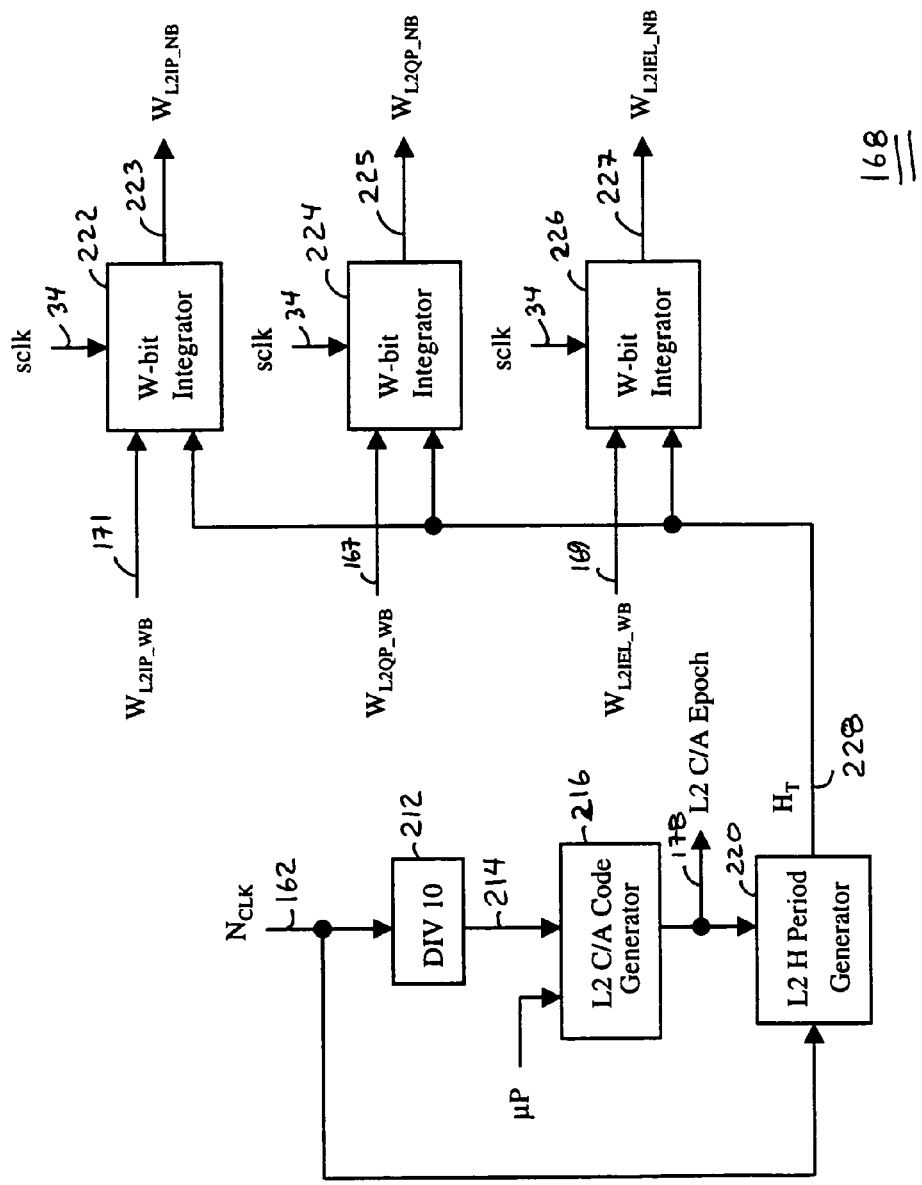
FIG. 11 illustrates W-code estimate integrators according to one embodiment of the invention.

FIG. 11 provides a detailed illustration of the W-Code integrators 168 according to one embodiment of the invention. In this embodiment, the nominal P-code clock signal ($N_{CLK}$) 162 is provided to divider 212, which divides the nominal P-code clock signal by 10 to generate a nominal C/A-code clock signal 214 (1.023 MHz) which in turn drives the C/A-code generator 216. In this embodiment, the C/A-code generator 216 provides a C/A-code epoch signal 178 which drives the H period generator 220 and the correlators 176. The H period generator 220 in the L2 tracker 54 is similar to H period generator of the L1 tracker 52 which has been described above. The wide-band W-code signals 167, 169, 171 are integrated across the respective W-code bit periods as defined by H period signal ($H_T$) 228 in integrators 222, 224, 226. The output narrow-band W-code signals ($W_{L2IP\_NB}$, $W_{L2QP\_NB}$ and $W_{L2IEL\_NB}$) 223, 225, 227 represent optimal integrations across the L2 W-code bit periods.

Figure 12:
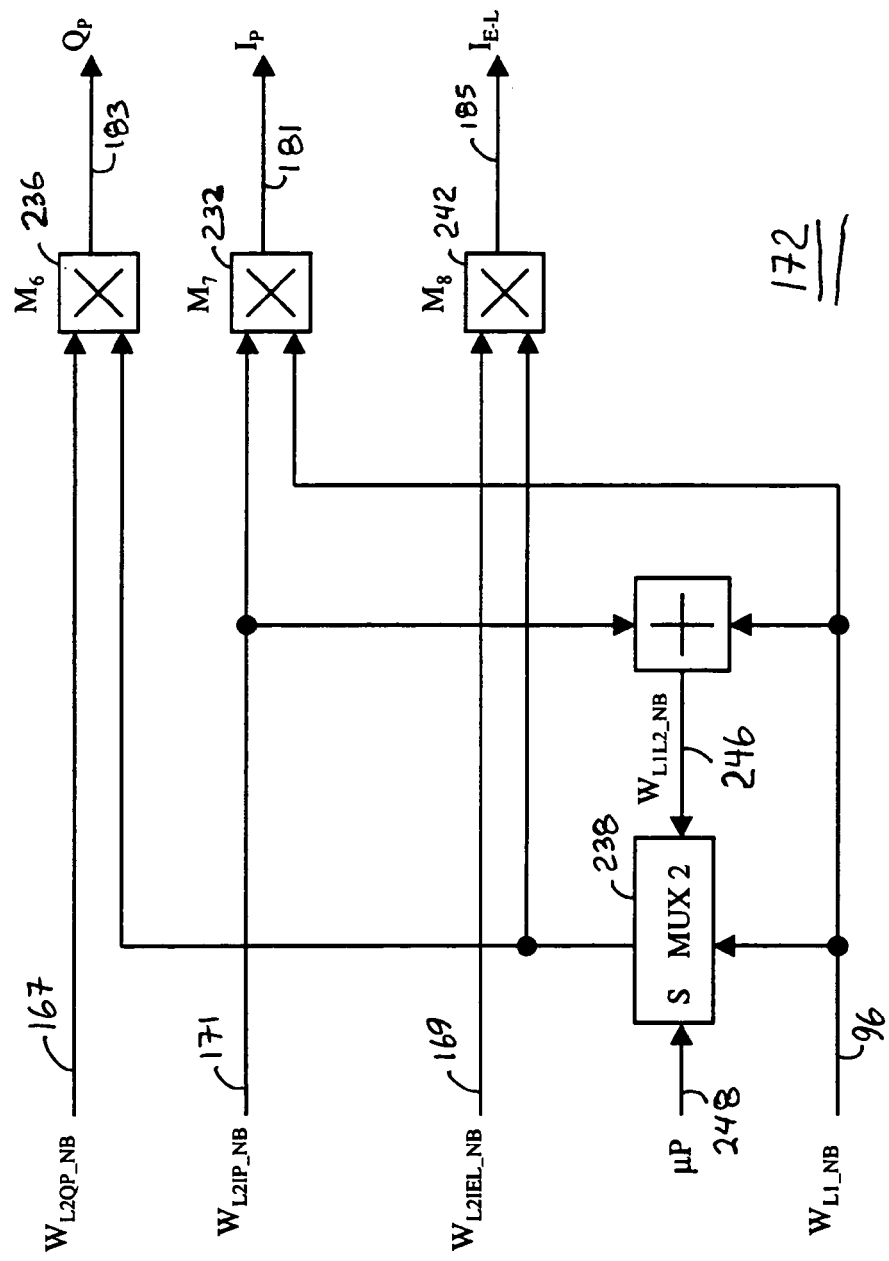
FIG. 12 illustrates W-code estimate multipliers according to one embodiment of the invention.

FIG. 12 provides a detailed illustration of the multipliers 172 according to one embodiment of the invention. As discussed above, these multipliers 172 are used to multiply the optimally integrated (that is across the respective W-code bit), the W-code estimate signal 96 of the L1 tracker 52 by the three versions of the narrow-band L2 W-code signals 167, 169, 171. Specifically, a first multiplier 232 combines the W-code estimate signal 96 with the narrow-band W-code in-phase punctual signal 171 to generate an in-phase punctual signal 181. Also, a second multiplier 236 combines the narrow-band W-code quadrature punctual signal 167 with the output of a multiplexer 238 to produce a quadrature punctual signal 183. A third multiplier 242 combines the narrow-band W-code in-phase early-minus-late signal 169 with the output of multiplexer 238 to produce an early minus late signal 185.

The multiplexer 238 output is selectable by the microprocessor system 14 from two inputs, the W-code estimate signal 96 from the L1 tracker 52 and the combined W-code estimate signal 246 which is generated by adding the W-code estimate signal 96 from the L1 tracker 52 and the narrow-band W-code in-phase punctual signal 171, which is the W-code estimate signal for the GPS L2 signal. These W-code estimate signals 96, 171 represent the best estimates of the W-code component for the GPS L1 and L2 signals, respectively. When searching for L2 signal power or when not locked to the L2 carrier, the microprocessor system 14 selects the W-code estimate signal 96 for output from multiplexer 238, since the W-code estimate signal 171 from the L2 tracker 171 is not yet accurate. However, once the local version of the L2 carrier signal is phase locked with the GPS L2 signal's carrier, the combined W-code estimate signal 246 provides the best estimate of the W-code contribution to the GPS L2 signal.

Figure 13:
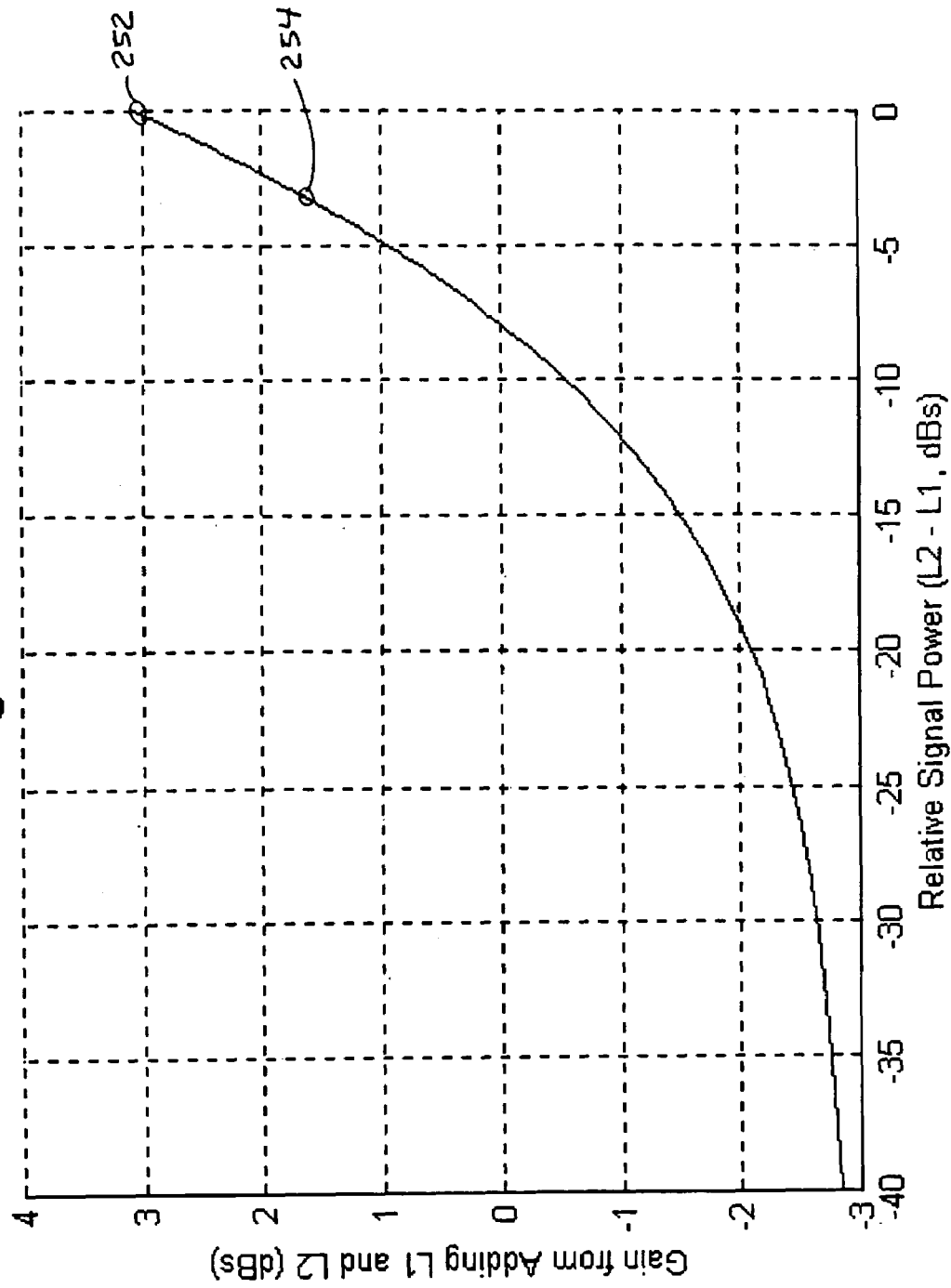
FIG. 13 illustrates the amount of signal-to-noise ratio gain or loss relative to different selection of W-code estimate signals according to one embodiment of the invention.

FIG. 13 provides an illustration of the signal-to-noise ratio gain versus relative signal power (GPS L2 signal relative to the GPS L1 signal) in accordance with one embodiment of the invention. FIG. 13 shows that if the received GPS L2 signal power is identical to the received GPS L1 signal power, that is, a relative signal power of 0 dB, the signal-to-noise ratio when combining the W-code estimate signals 96, 171 achieves a gain of +3 dB 252 in comparison to using the W-code estimate signal 96 from the L1 tracker 52 alone.

GPS sources nominally transmit the L2 Y-code (or P-code) component 3 dB weaker than the L1 Y-code (or P-code) component. Therefore, the nominal gain from using both techniques is typically about +1.7 dB 254. However, because GPS L2 signal semi-codeless tracking is performed at substantially weaker signal-to-noise ratios than full code tracking, the signal-to-noise ratio gain provided by this invention becomes significant in augmenting both tracking ability and measurements.

The combined W-code estimate signal 246 provides an advantage primarily if the noise in the narrow-band W-code integrated signals 170 is uncorrelated with the combined W-code estimate signal 246. Because the W-code estimate signal 171 from the L2 tracker 54 is input to multiplier 232 and is also part of the combined W-code estimate signal, the noise is somewhat correlated. Accordingly, multiplier 232 uses the W-code estimate signal 171 from the L2 tracker 54 instead of the combined W-code estimate signal 246.

The microprocessor system 14 reads the correlators 176 to track the GPS L2 signal. For example, the in-phase early-minus-late signal ($I_{E-L}$) 185 is used by the code tracking loop after it has been accumulated in the correlators 176 as the estimate of the code phase error and the quadrature punctual signal ($Q_P$) 183 is driven to zero as a function of closing the carrier tracking loop.

Figure 14:
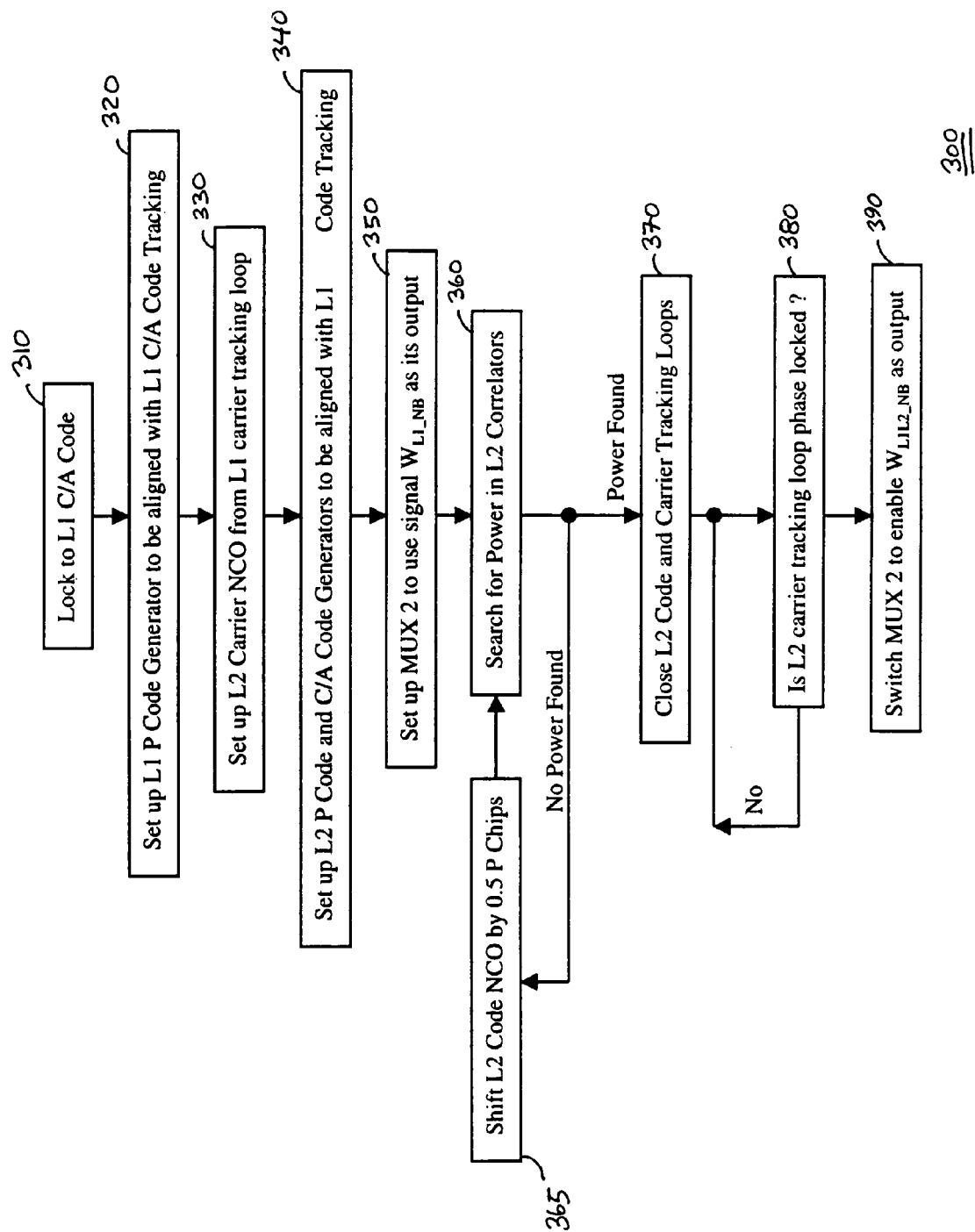
FIG. 14 illustrates a procedure for operating a GPS receiver according to one embodiment of the invention.

FIG. 14 provides a flow chart illustrating a procedure 300 for finding power and tracking the GPS L2 in accordance with one embodiment of the invention. In the first step 310, the GPS receiver 10 searches for and starts tracking the C/A-code component of the GPS L1 signal which can be performed conventionally.

Once this tracking is achieved, the GPS receiver 10 is "locked" to the L1 C/A-code and sufficient information is now available for the second step 320, that is, setting up the P-code generator 82. One conventional way to set up the P-code generator 82 employs conventional Z-count decoding, see for example, the reference ICD-GPS-200, above. Once set up, the locally generated P-code replica signal 86 is then substantially aligned in time with the L1 C/A-code and Y-code components of the GPS L1 signal and the Y-code component power from the GPS L1 signal appears primarily in quadrature baseband signal $Q_{BB}$. This results in the W-code estimate signal 96 providing an estimate of the W-code component signal power. Also, at this step 320, the H period generator 92 has been synchronized with the W-code component of the GPS L1 signal because the H period generator 92 has been reset by the C/A epoch signal 74 when the GPS receiver 10 became locked to the C/A-code component of the GPS L1 signal in step 310. Thus, the W-code estimate signal 96 is providing an optimal estimate of the L1 W-code component.

The next step 330, sets up the carrier NCO 154 of the L2 tracker 54 with an accurate frequency extracted from the L1 carrier tracking loop. As shown in some conventional GPS receivers, the L1 carrier frequency is first scaled by the relative carrier frequencies, that is, L1 carrier frequency/L2 carrier frequency, and is applied to the carrier NCO 154 in the L2 tracker 54. While an error is introduced due to the different effect of the ionospheric path on the two frequencies, this "carrier aiding" is advantageous (a narrower bandwidth for the L2 tracking loop can be used) until the L2 carrier loop has determined most of its dynamic requirements and can properly track the L2 carrier frequency by itself.

The next step 340, synchronizes the code NCO 164 and P-code generator 160 of the L2 tracker 54 with the code NCO 75 and P-code generator 82 of the L1 tracker 52, respectively. Because the microprocessor system 14 already knows the state of the code NCO 75 and P-code generator 82 of the L1 tracker 52, this process only involves copying the state of the L1 tracker 52 elements to the corresponding L2 tracker 54 elements.

The next step 350 is to set up multiplexer 238 to output the W-code estimate signal 96 from the L1 tracker 52. This selection ensures an optimal signal-to-noise ratio during the L2 power search step 360, that is, before the L2 carrier loop has been phase locked.

If GPS L2 signal power is not detected, that is, the sum of the squares of the in-phase and quadrature signals ($I_P$) 181 and ($Q_P$) 183 does not pass a predetermined threshold, in step 365, the code NCO 164 is phase shifted by 0.5 P-code bits and power is rechecked. When power is found, in step 370, the L2 code and carrier tracking loops are closed by the microprocessor system 14. Once the carrier tracking loop for the GPS L2 signal is closed and locked, step 380, multiplexer 238 is controlled by the microprocessor system 14 to output the combined W-code estimate signal 246, step 390.

Figure 15:
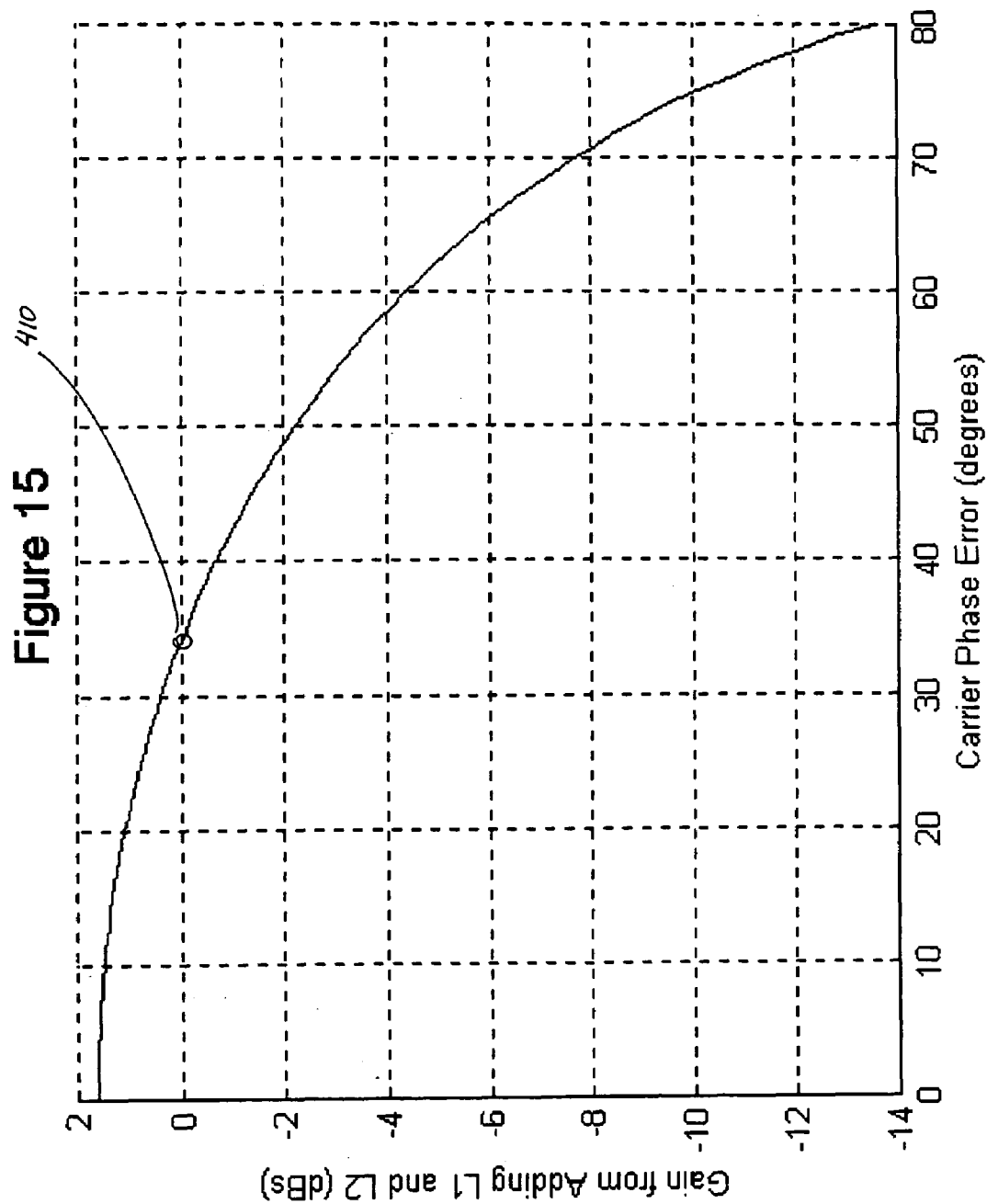
FIG. 15 illustrates a relationship between a carrier phase error and the selection of a particular W-code estimate signal according to one embodiment of the invention.

In order to determine whether the L2 carrier tracking loop is locked for step 390, the microprocessor system 14 uses the carrier phase error. FIG. 15 provides an illustration of the signal-to-noise ratio gain achieved when applying the combined W-code estimate signal 246 from the multiplexer 238 with respect to a carrier phase error between the carrier component of the GPS L2 signal and the locally generated L2 carrier signal 157. Because, as discussed above, one can assume that the GPS L2 signal power is 3 dB less than the GPS L1 signal power, the gain provided by using the combined W-code estimate signal 246 instead of the W-code estimate signal 96 diminishes as the carrier phase error increases. This effect is illustrated in FIG. 15 where the zero crossing point for gain 410 is around the 34° carrier phase error. Therefore, using the combined W-code estimate signal 246 is advantageous when the carrier phase error is less than 34°, but when the carrier phase error is greater than 34° using the W-code estimate signal 96 from the L1 tracker 52 is preferable. Accordingly, microprocessor system 14 uses the correlator outputs 175, for example, $I_{PC}$ and $Q_{PC}$, to estimate the carrier phase error either by calculating arctangent ($Q_{PC}/I_{PC}$) or by determining the phase error value of ($I_{PC} \times Q_{PC}$). This estimate, or a filtered version thereof, can then be used to generate switch signal 248 to control the multiplexer 238.

This invention allows for any number of bits to be used to represent the signals in the GPS receiver. For example, in one embodiment of the invention, because the intermediate frequency signals, $I_{L1}$ and $Q_{L1}$, are quantized and sampled at a sampling rate of 25 MHz, the quantization dictates the number of binary bits used to represent each sample. Once such conventional quantization scheme uses 1-bit quantization, while others use 2-bit quantization. However, while multi-bit quantization is beneficial in reducing quantization loss, decreasing loss in the signal-to-noise ratio, and in improving jamming immunity, in most GPS receiver designs, the number of bits used tends to increase ("fan out") as the signals are processed. For example, if the intermediate frequency signals, $I_{L1}$ and $Q_{L1}$ are 2-bit quantized, and the replica carrier signals 67, 69 are 2-bit quantized, then the baseband signal $I_{BB}$ and $Q_{BB}$ should be 3-bit numbers. Thus, the number of bits for representing the signals are determined by other factors in a GPS receiver design than required for the invention.

While this invention has been described with respect to a other GPS receiver designs can employ this invention, for example, a GPS receiver in which the intermediate frequency translation is performed after the code mixer.

Thus, it is apparent that in accordance with the present invention an apparatus and method that fully satisfies the objectives, aims, and advantages is set forth above. While the invention has been described in conjunction with specific embodiments and examples, it is evident that many alternatives, modifications, permutations, and variations will become apparent to those skilled in the art in the light of the foregoing description. Accordingly, it is intended that the present invention embrace all such alternatives, modifications and variations as fall within the scope of the appended claims.

What is claimed is:

1. An apparatus for tracking remotely generated signals comprising:
   a first tracker for tracking a first component of a first remotely generated signal and including a W-code signal generator responsive to a second component of the first signal for locally generating a first W-code signal from said second component of the first signal; and
   a second tracker for tracking a first component of a second remotely generated signal according to the first W-code signal; wherein
   the second component of the first signal has the same pattern as the first component of the second signal;
   the pattern comprises a known pattern combined with an unknown pattern; and
   the first tracker generates a first local component signal in accordance with the known pattern and combines the local component signal with a version of the first signal to generate the first W-code signal.

2. An apparatus for tracking remotely generated signals comprising:
   a first tracker for tracking a first component of a first remotely generated signal and including a W-code signal generator responsive to a second component of the first signal for locally generating a first W-code signal from said second component of the first signal; and
   a second tracker for tracking a first component of a second remotely generated signal according to the first W-code signal; wherein
   the second component of the first signal has the same pattern as the first component of the second signal;
   the pattern consists a known pattern combined with an unknown pattern; and
   the second tracker generates a second local component signal in accordance with the known pattern and combines the second local component signal with at least one version of the second signal to generate at least one second W-code signal.

3. An apparatus for tracking signals comprising:
   a first tracker for tracking a first component of a first signal and for generating a first estimate signal from a second component of the first signal; and
   a second tracker for tracking a first component of a second signal according to the first estimate signal; wherein:
   the second component of the first signal has the same pattern as the first component of the second signal;
   the pattern comprises a known pattern combined with an unknown pattern;
   the second tracker generates a second local component signal in accordance with the known pattern and combines the second local component signal with at least one version of the second signal to generate at least one second estimate signal; and the second tracker generates a timing signal in accordance with the timing information for improving the accuracy of the at least one second estimate signal.

4. An apparatus for tracking signals comprising:

a first tracker for tracking a first component of a first signal and for generating a first estimate signal from a second component of the first signal; and a second tracker for tracking a first component of a second signal according to the first estimate signal; wherein the second component of the first signal has the same pattern as the first component of the second signal;

the pattern comprises a known pattern combined with an unknown pattern;

the first tracker generates a first local component signal in accordance with the known pattern and combines the local component signal with a version of the first signal to generate the first estimate signal; and the second tracker combines the first estimate signal with the at least one second estimate signal to provide a tracking signal for tracking the first component of the second signal.

5. An apparatus according to claim 4, wherein:

the second tracker combines the first estimate signal with the at least one second estimate signal to generate a combined estimate signal.

6. An apparatus according to claim 5, wherein:

the second tracker combines the first estimate signal with the at least one second estimate signal when the second tracker has not locked to the first component of the second signal; and the second tracker combines the combined estimate signal with the at least one second estimate signal when the second tracker has locked to the first component of the second signal.

7. A method for tracking signals comprising the steps of:

locking to a first component of a first signal;

aligning a local version of a second component of the first signal with the first component of the first signal;

aligning a local version of a first component of a second signal with the first component of the first signal;

generating a first estimate signal from a version of the first signal and the local version of the second component;

applying the first estimate signal for locking to a first component of the second signal; and wherein the second component of the first signal and the first component of the second signal comprise the same pattern.

8. A method for tracking signals comprising the steps of:

locking to a first component of a first signal;

aligning a local version of a second component of the first signal with the first component of the first signal;

aligning a local version of a first component of a second signal with the first component of the first signal;

generating a first estimate signal from a version of the first signal and the local version of the second component;

generating a second estimate signal from a version of the second signal and a local version of the first component of the second signal;

combining the second estimate signal and the first estimate signal to generate a combined estimate signal; and selectively applying either the first estimate signal or the combined estimate signal for locking to a first component of the second signal; and wherein the second component of the first signal and the first component of the second signal comprise the same pattern.

9. The method of claim 8, wherein the step of selectively applying further comprises the steps of:

Selecting the first estimate signal for application if the local version of the first component of the second component has not been locked; and selecting the combined estimate signal for application if the local version of the first component of the second component has been locked.

10. A method of semi-codeless tracking for a GPS receiver comprising the steps of:

receiving a GPS L1 signal and generating at least a quadrature baseband version of the GPS L1 signal;

receiving a GPS L2 signal and generating baseband versions of the GPS L2 signal;

effecting a multiplication of the quadrature baseband version of the GPS L1 signal with a locally generated version of a P-code used to generate the Y-code component of both the GPS L1 and L2 signals, said multiplication generating a first estimate signal related to the W-code used with the P-code to generate the Y-code component;

multiplying the in-phase baseband version of the GPS L2 signal with a locally generated version of the P-code to generate a second estimate signal related to the W-code used with the P-code to generate the Y-code component;

adding the first W-code estimate signal to the second W-code estimate signal to generate a combined W-code estimate signal;

applying the first W-code estimate signal to generate tracking signals for tracking when the GPS receiver has not locked to the GPS L2 signal; and applying the second W-code estimate signal to generate tracking signals for tracking when the GPS receiver has locked to the GPS L2 signal.

11. A method of semi-codeless tracking for a GPS receiver comprising the steps of:

receiving a GPS L1 signal and generating at least a quadrature baseband version of the GPS L1 signal;

receiving a GPS L2 signal and generating baseband versions of the GPS L1 signal;

effecting a multiplication of the quadrature baseband version of the GPS L1 signal with a locally generated version of a P-code used to generate the Y-code component of both the GPS L1 and L2 signals, said multiplication generating a first wide-band estimate signal related to the W-code used with the P-code to generate the Y-code component;

integrating the first wide-band estimate signal based on known timing information of the Y-code to generate a first narrow-band W-code estimate signal;

multiplying the in-phase baseband version of the GPS L2 signal with a locally generated version of the P-code to generate a second wide-band estimate signal related to the W-code used with the P-code to generate the Y-code component;

integrating the second wide-band estimate signal based on known timing information of the Y-code to generate a second narrow-band W-code estimate signal;

adding the first narrow-band W-code estimate signal to the second narrow-band W-code estimate signal to generate a combined W-code estimate signal;

applying the first narrow-band W-code estimate signal to generate tracking signals for tracking when the GPS receiver has not locked to the GPS L2 signal; and applying the second narrow band W-code estimate signal to generate tracking when the GPS receiver has locked to the GPS L2 signal.

* * * * *